United States Patent
Prystupa et al.

(10) Patent No.: US 12,151,224 B2
(45) Date of Patent: Nov. 26, 2024

(54) DIRECTED ORIENTATION CHEMICAL KINETICS

(71) Applicant: 12198703 Canada Ltd., Winnipeg (CA)

(72) Inventors: David Allan Prystupa, Pinawa (CA); John Stephen Pacak, Winnipeg (CA)

(73) Assignee: 12198703 Canada Ltd., Winnipeg (CA)

( * ) Notice: Subject to any disclaimer, the term of this patent is extended or adjusted under 35 U.S.C. 154(b) by 333 days.

(21) Appl. No.: 17/387,533

(22) Filed: Jul. 28, 2021

(65) Prior Publication Data
US 2022/0032255 A1    Feb. 3, 2022

Related U.S. Application Data

(60) Provisional application No. 63/059,288, filed on Jul. 31, 2020.

(51) Int. Cl.
*B01J 19/00* (2006.01)
*B01J 19/12* (2006.01)

(52) U.S. Cl.
CPC .......... *B01J 19/0033* (2013.01); *B01J 19/12* (2013.01); *B01J 2219/12* (2013.01)

(58) Field of Classification Search
CPC ...... B01J 19/0033; B01J 19/087; B01J 19/10; B01J 19/12; B01J 2219/12; B01J 2219/0809
See application file for complete search history.

(56) References Cited

U.S. PATENT DOCUMENTS

| | | | |
|---|---|---|---|
| 5,814,200 A * | 9/1998 | Pethig | B03C 5/005 204/547 |
| 6,673,214 B1 * | 1/2004 | Marchitto | B01J 19/129 204/157.15 |
| 8,471,201 B2 * | 6/2013 | Hieke | H01J 49/06 250/396 R |
| 2005/0084980 A1 | 4/2005 | Koo et al. | |

(Continued)

FOREIGN PATENT DOCUMENTS

| | | |
|---|---|---|
| WO | WO0177045 | 10/2001 |
| WO | WO2010091344 | 8/2010 |

OTHER PUBLICATIONS

Stuyver, T. et al. "External electric field effects on chemical structure and reactivity." Wiley Interdisciplinary Reviews: Computational Molecular Science 10.2 (Jul. 26, 2019): e1438.

*Primary Examiner* — Shogo Sasaki
(74) *Attorney, Agent, or Firm* — Adrian D. Battison; Ade & Company Inc.; Ryan W. Dupuis

(57) ABSTRACT

A method to increase a probability of interaction of one molecule with a second molecule includes applying a sequence of temporally varying perturbations by acoustic forces and/or by electromagnetic fields or any combination thereof in at least two non-aligned directions to a volume containing the molecules. The sequence of temporally varying perturbations is chosen to produce a sequence of perturbed molecular configurations for the molecule in the volume and the sequence of perturbations is selected so as to cause the increase in probability. Initially data is obtained relating to orientations of the molecules and the sequence is selected based on the data. The data can be obtained by observation or by creating a known orientation using selected fields.

24 Claims, 9 Drawing Sheets

(56) References Cited

U.S. PATENT DOCUMENTS

| | | | |
|---|---|---|---|
| 2006/0063188 A1 | 3/2006 | Zanni et al. | |
| 2006/0269033 A1* | 11/2006 | Taleyarkhan | G01T 3/00 376/153 |
| 2009/0296871 A1* | 12/2009 | Taleyarkhan | G01T 3/00 376/153 |
| 2010/0120087 A1* | 5/2010 | Kibar | B01J 19/087 422/186.04 |
| 2010/0190198 A1* | 7/2010 | Kibar | B01J 19/087 528/480 |
| 2011/0294185 A1* | 12/2011 | Sooryakumar | G01N 33/54326 435/173.9 |
| 2013/0140472 A1 | 6/2013 | Searete | |
| 2015/0115169 A1 | 4/2015 | Hieke | |
| 2015/0377830 A1* | 12/2015 | Baldauf | G01N 33/48721 204/601 |
| 2016/0083838 A1* | 3/2016 | Hass | H01J 37/32596 118/723 VE |
| 2021/0016276 A1* | 1/2021 | Chiu | G01N 33/54366 |

\* cited by examiner

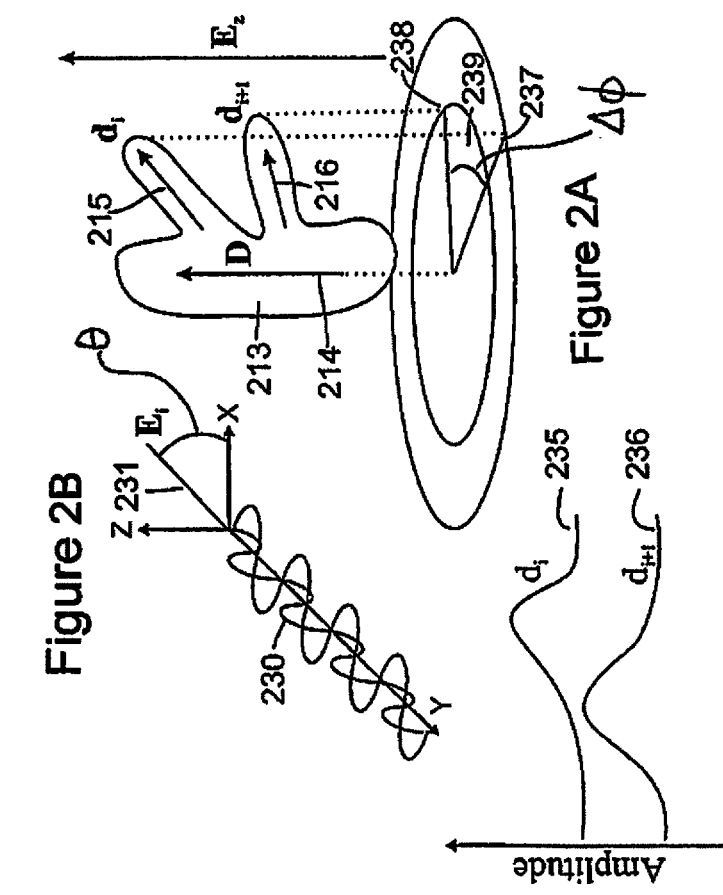
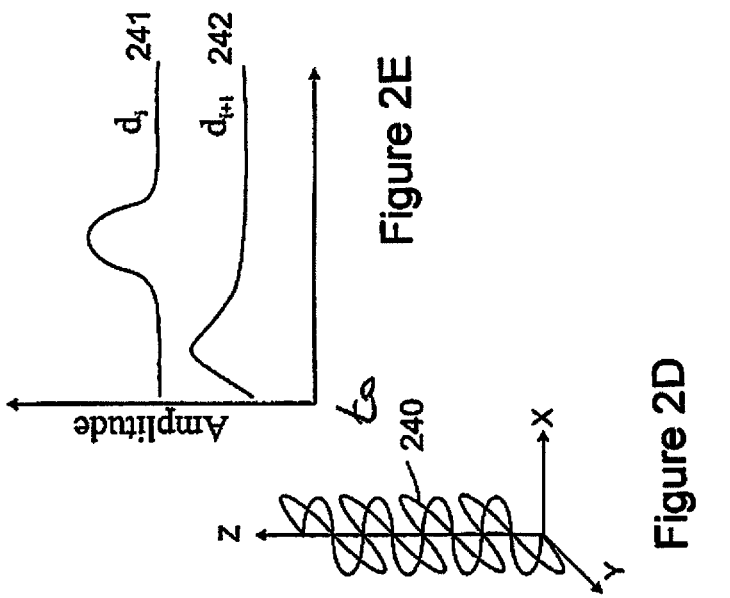
Figure 2A
Figure 2B
Figure 2C
Figure 2D
Figure 2E

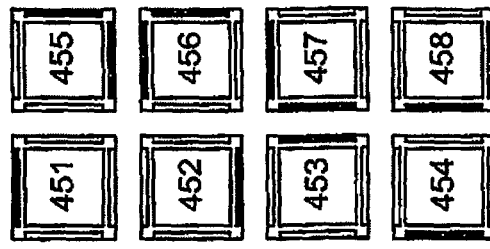
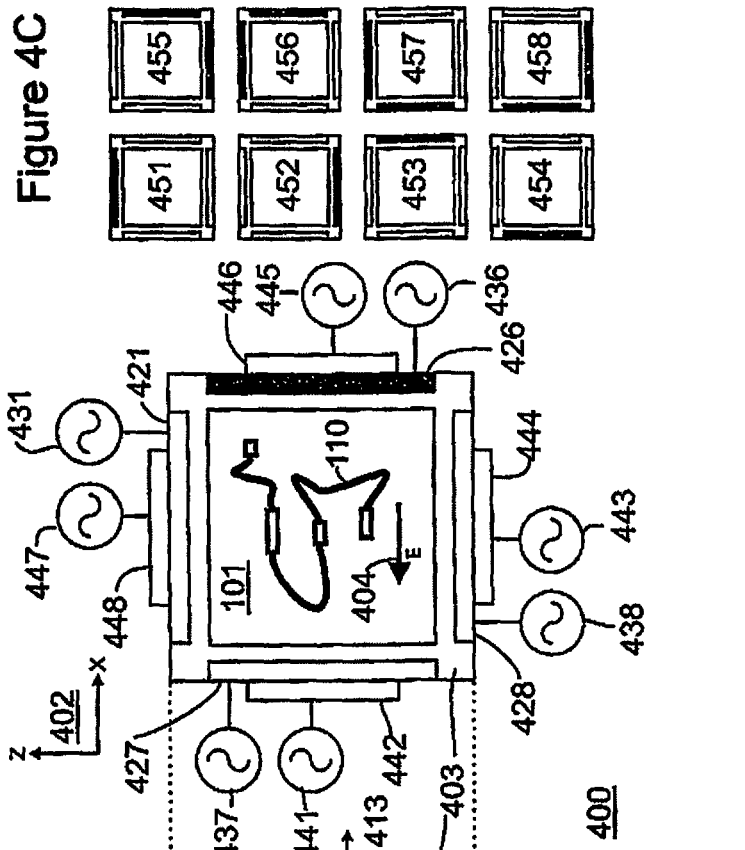
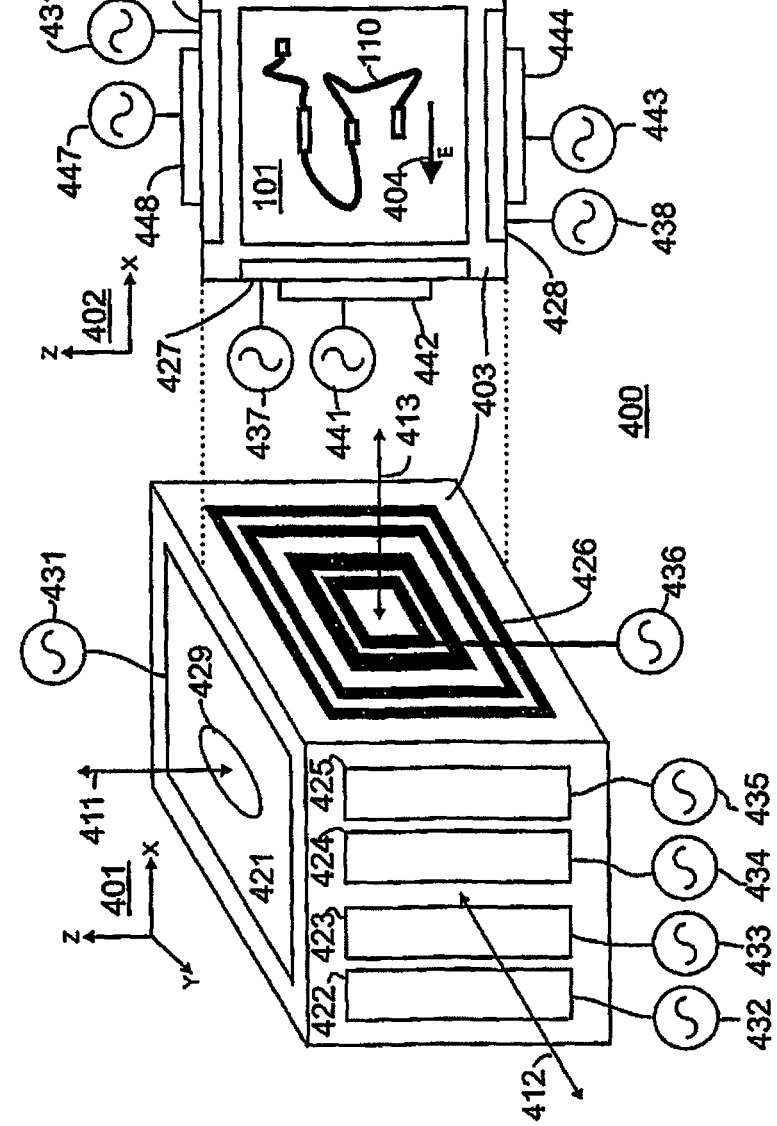

DIRECTED ORIENTATION CHEMICAL KINETICS

RELATED APPLICATIONS

This application claims the benefit under 35 USC 119 (e) of Provisional Application 63/059,288 filed Jul. 30, 2020 the disclosure of which is incorporated herein by reference.

This disclosure is related to disclosures relating to a spectrometer disclosed in the patent entitled High Efficiency Multiplexing, hereafter "HEMS patent" by the present inventors described in U.S. Pat. No. 10,585,044 issued Mar. 10, 2020, the disclosures of which are incorporated herein by reference.

This disclosure is related to disclosures relating to a field programmable analog array, hereafter "FPAA patent" by the present inventors described in U.S. Provisional application 62/978671 filed on Feb. 19, 2020, and in U.S. patent application Ser. No. 17/178551 and PCT application PCT/CA2021/050177 both filed Feb. 18th 2021 the disclosures of which are incorporated herein by reference.

This disclosure is related to disclosures relating to a FIELD PROGRAMMABLE FLUIDIC ARRAY, hereafter "FPFA patent" by the present inventors described in U.S. application 62/978,680 filed on Feb. 19, 2020, and in U.S. patent application Ser. No. 17/178,586 and PCT Application PCT/CA2021/050179 both filed February 18 the disclosures of which are incorporated herein by reference.

This disclosure is related to disclosures relating to an electric signal analyzer is a High Resolution Multiplexing System, hereafter "HRMS patent" by the present inventors described in U.S. application 62/767,186 filed Nov. 14, 2018, and in U.S. patent application Ser. No. 16/683,357 published in May 2020 as US2020/0150036, the disclosures of which are incorporated herein.

This disclosure is related to an application entitled Magnetic Platform for Sample Orientation as described in U.S. application 62/978,675 herein after the "MG patent" by the current inventors filed Feb. 19, 2020 and in U.S. patent application Ser. No. 17/178561 and PCT Application PCT/CA2021/050178 both filed Feb. 18, 2021, the disclosures of which are hereby incorporated herein by reference.

This disclosure is related to an application entitled Multi-dimensional Spectroscopy as described in U.S. application 63/059,298 herein after the "MDS patent" by the current inventors filed Jul. 31, 2020 and filed contemporaneously with the present application, the disclosures of which are hereby incorporated herein.

The invention relates to a method for directing interactions between molecules using electromagnetic fields and relates to interactions between molecules generally and particularly to interactions between biological molecules.

SUMMARY OF THE INVENTION

According to the invention there is provided a method for directing interaction between molecules comprising:
collecting the molecules within an interaction volume;
applying a sequence of temporally varying perturbations in at least two non-aligned directions to the interaction volume;
wherein the sequence of temporally varying perturbations is chosen to produce a sequence of perturbed molecular configurations for at least one molecule in the interaction volume;
and wherein the sequence of perturbations is selected so as to cause at least one selected orientation of said at least one molecule which increases a probability of interaction of said at least one molecule with a second molecule.

The method preferably includes the step of obtaining data relating to orientations of at least part of at least one of the molecules wherein the sequence is selected based on the data. The data can be obtained by observations or can be obtained by creating a known orientation using selected fields.

The arrangement as described herein therefore provides a method for directing a sequence of one or more interactions between molecules or parts thereof. A sequence of electromagnetic fields is applied to at least one molecule causing the configuration of the molecule to change from an initial configuration to a sequence of perturbed configurations. A first molecule in a perturbed configuration may then interact (or not interact) with a second molecule (which may or may not be in a perturbed configuration) wherein the rate and type of interaction may depend on the mutual configurations of the first and second molecules.

The interactions may be homogeneous between molecules of the same type. For example the interactions may be an aggregation, gelling or crystallization interaction.

The interactions may be heterogeneous between different types of molecules. For example, the interaction may be between an antibody and antigen or between an aptamer and protein or between sequences of nucleotides. The interaction may be a chemical reaction, a physical binding interaction, or a combination of both.

In a first embodiment, the second molecule is held at a fixed position and orientation on a substrate and the position, orientation and configuration of the first molecule relative to the substrate and the second molecule thereon is manipulated by application of a sequence of disturbances. The substrate can itself be fixed.

Alternatively the second molecule is fixed to a magnetic object which is positioned and oriented with the second molecule thereon by a sequence of magnetic fields and the first molecule is positioned, oriented and configured by a sequence of disturbances.

In a third embodiment, the first molecule type and second molecule type are positioned, oriented and configured by a sequence of disturbances wherein the sequence of disturbances has a different dynamical effect on the first molecule type than on the second molecule type. The sequence of disturbances is selected to either increase or decrease the probability of interaction between the first molecule type and the second molecule type. The disturbances may be acoustic waves or electromagnetic fields.

The term "molecule" herein refers to a group of atoms that act dynamically as a cohesive unit due to mutual interactions among its members. The group may be of any size ranging from small solvent molecules such as water to biological macromolecules such as proteins. In large molecules, the degree of correlation between atomic movements is higher between atoms within the group that are proximate than between atoms within the group that are distant. The terms "molecular fragment" or "portions thereof" herein refers to a subgroup of atoms with a higher degree of dynamical correlation within the subgroup than with the molecule as a whole. A subgroup of atoms may for example be a chemical functional group such as an amino group. A subgroup of atoms may for example be a side chain of a macromolecule. A subgroup may for example be a domain within a protein. The term "perturbed configuration" herein means that the mean atomic coordinates of the target molecule, if it were in the ground quantum state, are different from the mean atomic coordinates for the initial configuration in the ground quantum state. The temporal sequence of disturbances may be electromagnetic, acoustic or any combination of electromagnetic and acoustic.

In a sample containing molecules of types selected for interaction at thermal equilibrium, each molecule or portion thereof undergoes thermally activated reconfigurations among a plurality of potential energy minima. The potential energy function includes terms describing the electronic configuration of the molecule (covalent bonds), hydrogen bonds, Van der Waals interactions, and ionic interactions. Reconfiguration here means that at least one atom of a molecule or part thereof moves from a first volume of space to a second volume of space. The time varying sequence of disturbances is applied to a sample containing selected molecules and perturbs the potential energy function of the selected molecules. The disturbance may be an electromagnetic field applied directly or an acoustic disturbance that imposes electromagnetic effects indirectly via inter-molecular interactions. The minimum electromagnetic field strength that may be used with the method of this disclosure is just sufficient to induce a non-thermal distribution of configurations for at least one population of molecules or portions thereof. As the electromagnetic field strength increases, the deviation from a thermal population increases and new configuration states may become available to each population of molecules or portions thereof. That is a first population of molecules or portions thereof may be distinguished from a second population of molecules or portions thereof by changing the electromagnetic field strength so as to make a new set of configuration states available to said first population.

The dynamical response of each molecule or portion thereof to a disturbance depends on the applied electromagnetic field, molecular charge distribution, the distribution of mass, interactions with proximate molecules or portions thereof, and thermal excitations. The applied electromagnetic field is here taken to include possible local electromagnetic interactions from molecular collisions induced by applied acoustic waves. Each molecule or portion thereof acts as a damped oscillator driven by the applied temporally varying electromagnetic field and damped by thermal excitations and interactions with proximate molecules or portions thereof. In response to the temporally varying electromagnetic field, the molecules or portions thereof have a temporally varying preferred configuration. The temporal preferred configuration of each type of molecules or part thereof may have a different phase relationship with the applied temporally varying electromagnetic field. In a DC or slowly varying electric field, all molecules or parts thereof are in phase. As the frequency of the applied electric field increases, heavy or tightly bound molecules or parts thereof are overdriven and fall out of phase with the applied electromagnetic field. Hence by varying the frequency of the applied electromagnetic field, a first set of molecules or portions thereof may have a temporally varying first preferred configuration and a second set of molecules or portions thereof may have a temporally varying second preferred configuration. The temporal sequence of mutual preferred configurations of the molecule types is selected to increase or decrease the probability of a desired or undesired interaction between different molecule types.

In accordance with an important feature of the invention, there is provided an interaction volume containing a first type of molecule and a second type of molecule, an electromagnetic field generator operable to generate a temporal sequence of electromagnetic fields through the interaction volumes, and a control unit. The control unit includes an integral computation component, data storage, communication component and analog signal component. The control unit generates a sequence of signals which cause the electromagnetic field generator to generate a sequence of electromagnetic fields. The sequence of electromagnetic fields may include electric fields, magnetic fields, or any combination of electric and magnetic fields. The electromagnetic field generator may for example be a laser. The electromagnetic fields may for example be produced by a field programmable analog array as described in the above cited FPAA patent by the present inventors.

In accordance with an important optional feature of the invention which can be used independently with any of the above or following features, there is provided a spectroscopy system which may be the multi-dimensional spectroscopy system more fully described hereinafter. Spectral data from the spectroscopy system provides feedback about the configurations of molecules and interactions (if any) between molecules. The feedback may be analyzed by the computation component to select a sequence of electromagnetic fields that optimizes the probability of interaction between different molecule types. The analysis may be performed by an artificial intelligence agent integral to the computation component.

In accordance with an important optional feature of the invention which can be used independently with any of the above or following features, there is provided an acoustic transmitter operable to emit acoustic waves. The acoustic transmitter may for example generate ultrasonic waves that are incident upon, and interact with, sample molecules causing a configuration change. On a molecular level, acoustic waves are transmitted by molecular collisions preferentially along the axis of acoustic wave propagation: functionally equivalent to a directional temperature. The energy and momentum supplied by directional molecular collisions may for example overcome a potential energy barrier between molecular configuration states thereby facilitating a transition from a first molecular configuration state to a second molecular configuration state.

In accordance with an important optional feature of the invention which can be used independently with any of the above or following features, there is provided a substrate surface that induces a preferred orientation upon at least one type of molecules or parts thereof that are proximate to said substrate surface. The substrate surface may for example be a crystallographic plane wherein the periodic electronic configurations of atoms at the plane surface interact with proximate molecules to induce a preferred orientation of the proximate molecules. The substrate surface may for example be coated with a first type of molecules that are oriented by steric hinderance and said first type of molecules includes an oriented functional group that interacts with a second type of molecules to induce a preferred orientation of said second type.

In accordance with an important optional feature of the invention which can be used independently with any of the above or following features, there is provided a complex magnetic object with at least one substrate surface that may be oriented by an applied magnetic field. The complex magnetic object may for example be the complex magnetic object described in the above cited MG patent. The magnetic fields required to orient the complex magnetic object may for example be generated by the arrangement of the above cited FPAA patent.

In accordance with an important optional feature of the invention which can be used independently with any of the above or following features, there is provided in the interaction volume a first molecule type that acts a recognition complex and a second molecule type that is a substrate molecule wherein the recognition complex molecule binds specifically with said substrate molecule. That is the volume contains a plurality of different molecule types and each of said different molecule types is cycled through a sequence of configurations by a sequence of perturbations so as to be tested for interaction with said second molecule as a recognition complex. The interaction volume may also contain a plurality of molecule types that do not bind specifically with the recognition complex. The recognition complex may bind with a plurality of substrate molecule types in the interaction volume wherein the affinity for interaction with each substrate molecule type may be different. The recognition complex may be attached to a fixed substrate. The recognition complex may be attached to a surface on a complex magnetic object and recognition complex is oriented by orienting the complex magnetic object with sequence of magnetic fields. The recognition complex may include a label material that produces a distinct spectral signal in response to a probe radiation. The recognition complex may be inactive in the unbound state and cause reporter molecules to be produced in the bound state wherein the reporter molecules produce a distinct spectral signal in response to a probe radiation. For each molecule type the spectral signal depends on the configuration and orientation of the molecule relative to the direction and polarization vectors of probe radiation. Hence by perturbing the orientation and configuration of a molecule the spectral signal changes. The spectral signal may be absorption of probe radiation at characteristic wavelengths; absorption of probe radiation applied at a first wavelength followed by emission of radiation at a second wavelength with a temporal delay, elastic scattering of one or more probe wavelengths, or Raman scattering of one or more probe wavelengths with a change in photon energy characteristic of each type of molecule. The recognition complex may produce a first spectral signal when not bound with a substrate molecule and a second spectral signal when bound with a substrate molecule. The recognition complex may for example be an antibody, or an antigen that recognizes a protein structure or part thereof. The recognition complex may for example include a nucleic acid sequence that binds specifically with a specific nucleic acid sequence in the collection of sample molecules. The label material may for example be a fluorescent marker. The label material may for example produce a distinct Raman or resonance Raman signal.

In accordance with an important optional feature of the invention which can be used independently with any of the above or following features, there is provided a micro-fluidic array operable to transport molecules of a first type into an interaction volume containing molecules of a second type. The interaction volume herein is the volume region influenced by electromagnetic and acoustic fields as described above. The micro-fluidic array may for example bring a sequence of test samples into proximity with diagnostic molecules wherein the test samples and/or diagnostic molecules are driven through a sequence of configurations by a sequence of electromagnetic and acoustic fields. The micro-fluidic array may be for example the arrangement described in the above cited FPFA patent by the current inventors.

In an embodiment that may be used in combination with any of the preceding or following embodiments, a sequence of temporally varying electric fields is applied to an interaction volume containing a first type of molecules and a second type of molecules, wherein the angle between at least two electric field vectors in the sequence is greater than 0 degrees and less than 180 degrees and wherein the sequence of time varying electric fields is selected to change the configurations of the first and second molecule types to make interaction more probable. The first and second molecule types may each have an interaction axis and the temporally varying electric fields function to align the interaction axis of a first molecule with the interaction axis of a second molecule.

In an embodiment that may be used in combination with any of the preceding or following embodiments, a temporally varying electric field is applied to a collection of molecules consisting of a plurality of molecular types wherein the degree of orientation induced by the electric field is greater for a first type of molecules than the degree of orientation induced for a second type of molecules. For example, the first type of molecule may have a dipole moment equal to the second type of molecule and a smaller moment of inertia than the second type of molecule. Due to the smaller moment of inertia the first type of molecule may orient relative to the applied electric field at a higher rate.

In an embodiment that may be used in combination with any of the preceding or following embodiments, a recognition complex is added to a collection of sample molecules in the interaction volume and a sequence of electromagnetic fields are applied causing a preferred orientation of substrate molecules within the collection of sample molecules and a preferred orientation of recognition complexes wherein the mutual preferred orientations change the probability of a recognition complex interacting with a substrate molecule. For example a DC electric field may be applied to align the net dipoles of both recognition complex and substrate molecule and a temporally varying field is applied to causing variation in the relative orientation of recognition complex and substrate molecule so as to align the substrate molecule with an active site of the recognition complex. This approach requires the recognition complex and substrate molecule to have different dynamical properties.

In an embodiment that may be used in combination with any of the preceding or following embodiments, a first sequence of applied electromagnetic fields increases the probability of substrate molecule recognition by a recognition complex specific to the substrate molecule. That is the probability of interaction between the substrate molecule and recognition complex is increased. The interaction may for example be the formation of at least one covalent, ionic, dipole-dipole or Van der Waals bond between the substrate molecule and the recognition complex. Optionally a second sequence of applied electromagnetic fields may be used to measure the interaction between the substrate molecules and recognition complexes as described more fully in the above cited MDS patent by the current inventors. This embodiment may be used for example to reduce the time required for nucleic acid sequence recognition hence making nucleic acid testing faster.

In an embodiment that may be used in combination with any of the preceding or following embodiments, a second sequence of electromagnetic fields reduces the probability of substrate molecule recognition. This embodiment may be used for example to silence some recognition complexes while others are active in a sequence of different recognition reactions.

In an embodiment that may be used in combination with any of the preceding or following embodiments, at least one electric field in the sequence of electric fields applied to the interaction volume may be applied in the form of electromagnetic radiation (a flux of photons). The applied electric fields interact with the charge distribution of each molecule and may add a directional force to the pre-existing inter-molecular and intra-molecular forces acting on each atom within the molecule. The flux of photons may for example cause a molecule to transition from a ground state with a first electronic charge distribution to an excited state with a second electronic charge distribution. The flux of photons may for example cause ionization of a molecule with associated change in electronic charge distribution. The molecular configuration then adjusts dynamically to the new net forces at each atom giving a sequence of perturbed configurations. The re-configuration dynamics may be fast (<1 ps) if a single unhindered step is required. The re-configuration dynamics may be slow (>1 µs) if many steps are required or there are potential energy barriers that hinder re-configuration. While the starting molecular configurations are generally at thermal equilibrium and may be described by the methods of statistical mechanics, the sequence of perturbed configurations is non-equilibrium. The present invention makes these non-equilibrium configurations available for interaction. Preferably at least one electric field in the sequence of electric fields has a frequency that is less than or equal to a reconfiguration rate of at least one molecule type in the sample.

In an embodiment that may be used in combination with any of the preceding or following embodiments, one or more high frequency electromagnetic fields (ie UV, x-ray) may cause ionization or promote electrons to an excited state, and a sequence of lower frequency electric fields effects a change in molecular configuration by acting on the altered electronic state.

In an embodiment that may be used in combination with any of the preceding or following embodiments, a sequence of temporally varying acoustic waves is applied to the interaction volume. The acoustic waves bias molecular collisions along the transmission axis of the acoustic wave, which may cause molecules or portions thereof to preferentially orient relative to the acoustic wave propagation direction. The sequence of acoustic waves may include a first sub-sequence of acoustic waves that sets the configuration of a population of molecules or parts thereof and a second sub-sequence of acoustic waves that causes temporal evolution of the configuration states of the molecules or portions thereof. The acoustic wave may for example cause displacement and re-arrangement of solvent molecules relative to macromolecules to be interacted. For example, the preferred direction of electric dipole moments of solvent molecules may be modulated by acoustic waves and the solvent electric dipole moments alter the electronic structure of macromolecules to be interacted. The solvent molecules may for example be water. The sequence of acoustic waves may include a single frequency or may include a plurality of frequencies. The sequence of acoustic wave frequencies may be chirped. The acoustic waves may for example be generated by a piezo-electric element. The acoustic waves may for example be generated by moving a magnetic object within a solution containing molecules to be analyzed by electromagnetic fields. The electromagnetic fields may be produced for example by a field programmable analog array as described in the above cited FPAA patent.

In an embodiment that may be used in combination with any of the preceding or following embodiments, a reactant molecule is oriented at least in part by a flux of solvent molecules. Solvent molecules in fluid flow have momentum preferentially in the direction of fluid flow and may transfer said momentum to reactant molecules. Reactant molecules with a preferred axis will tend to orient with the axis in the direction of flow. In contrast, electromagnetic fields act on molecular charge distribution, which may be independent of the molecular axis and have a component perpendicular. Hence molecules may be oriented in any direction that is a vector sum of fluid flow and electromagnetic forces.

In an embodiment that may be used in combination with any of the preceding or following embodiments, a sequence of temporally varying electric fields is applied to an interaction volume containing a first type of molecules and a second type of molecules to interact, and a third type of molecules to not interact, wherein the angle between at least two electric field vectors in the sequence is non-aligned, that is greater than 0 degrees and less than 180 degrees and wherein the sequence of time varying electric fields is selected to change the configurations of the first and second molecule types to make interaction more probable and the sequence of time varying electric fields changes the configuration of the third molecule type making interaction less probable. That is in a solution containing a plurality of molecule types that can potentially interact; the sequence of time varying electric fields is used to select which molecular species interact and which molecular species do not interact. For example, a first interacting species A may be immobilized on a surface and capable of interacting with both molecular species B and C when the dipole moment of B or C is pointed along a preferred axis and further B has a smaller moment of inertia than C. In a first example for which interaction of A with B is preferred, a first DC electric field orients both B and C perpendicular to the interaction axis so that neither may interact with A. A second electric field is applied in the direction of the interaction axis for a short time interval. Within the short time interval B, having a smaller moment of inertia orients with the second electric field and interacts with A. Within the short time interval C, having a larger moment of inertia incompletely reorients in the direction of the interaction axis and does not interact. The perpendicular DC field then attracts both B and C into a non-interacting perpendicular orientation. In a second example for which interaction of A with C is preferred, a first DC electric field orients both B and C parallel to the interaction axis so that both may interact with A. A second electric field perpendicular to the interaction axis is activated for a short time interval causing B to reorient perpendicular to the interaction axis during the short time interval while C reorients slower and remains capable of interacting. Because C spends more time oriented along the interaction axis, the probability of A interacting with C is enhanced relative the probability of A interacting with B.

In an embodiment that may be used in combination with any of the preceding or following embodiments, a first temporal sequence of electromagnetic fields is applied in a first interaction volume to a first set of interacting molecules and a second temporal sequence of electromagnetic fields is applied in a second interaction volume for a second set of interacting molecules wherein at least some of the interacted molecules in the first set are included in the second set of interacting molecules. For example, molecule A and molecule B are placed in a first interaction volume and a sequence of electromagnetic fields is applied causing A to interact with B to form a complex AB. Complex AB is then placed in a second interaction volume with C and a sequence of electromagnetic fields is applied causing complex AB to interact with C to form complex ABC. In some embodiments the first interaction volume and the second interaction volume coincide and a temporal sequence of different interaction molecules are added to the common interaction volume. A temporal sequence of electromagnetic fields may be applied to interaction molecules preceding, during, or following addition to an interaction volume. In some embodiments the first interaction volume and second interaction volume are separate chambers in a micro-fluidic system wherein interaction products from the first interaction volume are transported to the second interaction volume. In some embodiments the interaction volumes may have one or more associated reservoirs wherein each reservoir contains a different type of molecules or combination thereof. A network of interaction volumes, reservoirs and connecting channels may for example be the arrangement described in the above cited FPFA patent.

In an embodiment that may be used in combination with any of the preceding or following embodiments, a plurality of interaction volumes are connected in a series and a different temporal sequence of electromagnetic fields is applied to each interaction volume wherein the interaction product of each interaction volume is transferred to the next interaction volume in the series. That is a sequence of different interaction steps may be promoted wherein a different sequence of electromagnetic fields is applied to each step. In a preferred embodiment each step takes the same amount of time: that is the sequence of steps is pipelined. The process may be pipelined for example by varying the size of each interaction volume. In some embodiments the interaction volumes may have one or more associated reservoirs wherein each reservoir contains a different type of molecules or combination thereof. A network of interaction volumes, reservoirs and connecting channels may for example be the arrangement described in the above cited FPFA patent.

In an embodiment that may be used in combination with any of the preceding or following embodiments, a temporal sequence of electromagnetic fields is repeated periodically to produce a periodic temporal sequence of molecular configurations for a first molecule type and for each temporal sequence a second molecule type is transported proximate to the first molecule type at a constant temporal offset relative to the start of each temporal sequence. For example, molecule A may react with molecule B when molecules A and B are in a particular mutual configuration or set of configurations. Molecule A is cycled through a sequence of possible reactive configurations by the temporal sequence of electromagnetic fields wherein the number of possible reactive configurations is far less than the number of unreactive configurations. A reactive configuration herein means a configuration that is more has a higher probability of interaction that the probability of interaction averaged over all possible configurations. The reactive configuration may depend for example on a configuration parameter of molecule B, wherein the configuration parameter of B has a plurality of possible values when molecule B is brought proximate to molecule A. The sequence of electromagnetic fields tests each possible reactive configuration of A until the mutual configuration of A and B corresponds to a reactive state and a reaction becomes likely. Because fewer mutual configurations are tested on average, and the configurations tested have higher than average probability of interaction, the electromagnetically driven reaction may occur substantially faster than a thermally driven process.

In an embodiment that may be used in combination with any of the preceding or following embodiments, a "lock" surface is placed within or proximate to a volume containing a collection of sample molecules and a molecule acting as a recognition complex is attached to the "lock" surface wherein the "lock" surface confers a preferred orientation to a recognition region of the recognition complex. A sequence of electromagnetic fields is applied to the collection of sample molecules so as to cause substrate molecules within the collection of sample molecules to align relative to the preferred orientation of the recognition region so as to change the probability of the substrate molecule interacting with and binding to the recognition region. For example, the sequence of electromagnetic fields may align a substrate molecule "key" with a recognition region "lock". For example the "lock" surface may be on a complex magnetic object oriented by a magnetic field and the "key" substrate molecule may be oriented by an electric field.

In an embodiment that may be used in combination with any of the preceding or following embodiments, a sequence of electromagnetic fields is applied to a collection of sample molecules wherein each electromagnetic field in the sequence orients a substrate molecule or part thereof relative to a possible orientation of a recognition complex. For example, the orientations of individual recognition regions of recognition complexes may have a conical distribution about a preferred direction. A sequence of electromagnetic fields orients substrate molecules relative to each possible recognition complex orientation in turn so as to increase the probability of binding.

In an embodiment that may be used in combination with any of the preceding or following embodiments, a first type of molecule is attached to a substrate surface within or abutting the interaction volume. The substrate surface may for example be a crystal that induces a preferred orientation on the first type of molecule. The substrate may for example limit the number of probable configurations of the first molecule type so as to expose a reactive region in a limited number of configurations for interaction with a second molecule type. A sequence of electromagnetic fields is applied causing the second molecule type to transition through a series of configurations wherein at least some configurations of the second molecule type correspond to a configuration that may interact with a configuration of the first molecule type. Preferably a majority of second molecule configurations induced by the sequence of electromagnetic fields are configurations that may interact with a configuration of the first molecule type.

In an embodiment that may be used in combination with any of the preceding or following embodiments, a first type of molecule is attached to a substrate surface on a complex magnetic object within the interaction volume together with a second molecule type. A sequence of magnetic fields orients and positions the complex magnetic object within the interaction volume, hence positioning and orienting the first type of molecules. The magnetic fields may be generated for example by the arrangement described in the FPAA patent. For example, the complex magnetic object may be translated along a path within the interaction volume to bring the first type of molecules proximate to the second type of molecules throughout the interaction volume. A sequence of electromagnetic fields is applied causing the second molecule type to transition through a series of configurations wherein at least some configurations of the second molecule type correspond to a configuration that may interact with a configuration of the first molecule type.

In an embodiment that may be used in combination with any of the preceding or following embodiments, spectra of the interaction volume are measured for at least one applied electromagnetic field in the sequence of electromagnetic fields. The spectra may for example be measured by the arrangement described hereinafter, which has several elements in common with the arrangement of the present invention. Preferably a plurality of spectra is measured during the period of one electromagnetic field in the sequence of electromagnetic fields. The spectra are analyzed by the computation means to provide information about the abundance of at least one molecule type. The molecule type may for example be the first or second molecule types, an interaction complex, a recognition complex, a substrate molecule, or a combination of substrate and recognition complex. Preferably the spectra are analyzed to provide information about a plurality of molecule types. Spectral information may be used in three modes. In the first mode, spectral information is used to monitor the progress of interaction between two or more molecule types. In the second mode, spectral information is used to determine whether an interaction between molecules has occurred. For example, spectral information may be used to determine whether a recognition complex has bound with a substrate. In the third mode, trial sequences of electromagnetic fields are applied to an interaction volume and the resulting concentrations of molecule types are determined with spectroscopic measurements. The computation means selects a sequence of electromagnetic fields that produces desired concentrations of molecule types. In some embodiments the computation means uses prior knowledge about molecular geometry to model the effect of a sequence of electromagnetic fields. In some embodiments the computation means infers a favorable sequence of electromagnetic fields from a series of test sequences using an artificial intelligence algorithm.

In an embodiment that may be used in combination with any of the preceding or following embodiments, a sequence of electromagnetic fields induces a sequence of interactions between a first molecule type and a second molecule type wherein each interaction is guided by a sub-sequence of electromagnetic fields and wherein each sub-sequence depends at least in part on dynamical constraints due to preceding interactions. For example, a first sequence of electromagnetic fields may induce a sequence of mutual configurations between two strands of nucleotides until a mutual configuration that interacts is encountered as detected by measurement. The measurement may for example detect a change in spectra with interaction. The measurement may for example detect a change in the period of electromagnetic field induced oscillation due to higher reduced mass of the bound state as discussed hereinafter. Upon detection of the bound state, the control unit selects a second sequence of electromagnetic fields to explore mutual configurations of the dynamically constrained bound state. Due to the constraint, fewer mutual configurations need to be sampled to induce a second interaction.

In an embodiment that may be used in combination with any of the preceding or following embodiments, a sequence of perturbations is applied to a molecular fragment causing the molecular fragment to transition through a sequence of configurations at a rate higher than the thermal rate. In a system at thermal equilibrium, the number of molecular collisions and hence the number of configurations a molecular fragment transitions through per unit time is determined by temperature. A sequence of electromagnetic fields may be applied to selectively excite a molecular fragment to transition through a sequence of configurations at a frequency higher than the frequency of molecular collisions. Preferably the configurations of a first molecular fragment in the sequence of configurations are more likely to interact with a selected second molecular fragment type than configurations not included in the sequence of configurations. Further the magnitude of force applied to a molecular fragment by electromagnetic fields may be a selected magnitude whereas the impulsive forces from molecular collisions have a broad distribution related to the Boltzmann distribution of energy among molecules. In some embodiments a sequence of electromagnetic fields is applied to a molecular fragment at a higher rate than thermal collisions and with lower force. In some embodiments a sequence of electromagnetic fields is applied to a molecular fragment at a higher rate than thermal collisions and with higher force. In some embodiments a sequence of electromagnetic fields is applied to a molecular fragment at a higher rate than thermal collisions and with a distribution of force transferred approximating a thermal distribution of force. Further the thermal distribution of forces applied may be at an effective temperature different than the overall sample temperature. For example the molecular fragment may be "hotter" than the rest of the molecule and surrounding molecules.

In an embodiment that may be used in combination with any of the preceding or following embodiments, a first sequence of perturbations changes the configuration of a first molecule type to a base configuration proximate to a locus of configurations that may interact with a second molecule type and a second sequence of perturbations causes random changes in the base configuration wherein at least one change to the base configuration of the first molecule type enables interaction with a second molecule type. The second sequence of perturbations may for example be a pseudo-random sequence of perturbation amplitudes and direction. The second sequence of perturbations may for example emulate thermally activated perturbations from molecular collisions wherein the effective temperature is different from the sample temperature. The configuration for a first molecule type to interact with a second molecule type depends upon the configuration of the second molecule type, which varies due to thermal fluctuations. This embodiment searches configuration space within a region proximate to the variable interaction configuration.

In an embodiment that may be used in combination with any of the preceding or following embodiments, a first sequence of disturbances to interact a first molecule type and a second molecule type is composed by performing the steps of generating a random sequence of disturbances; placing molecules to be interacted in an interaction volume; imposing the random sequence of disturbances on the interaction volume; measuring spectra of the interaction volume for each disturbance; analyzing the spectra to determine the interaction rate; correlating the interaction rate with each disturbance and sequence of disturbances; and selecting disturbances or sequences of disturbances with the greatest correlation with the measured interaction rate.

In an embodiment that may be used in combination with any of the preceding or following embodiments, a first sequence of disturbances to interact a first molecule type and a second molecule type is composed by performing a sequence of dynamical calculations based on modeled or experimentally determined molecular structure parameters and interaction parameters. First the required interaction state parameters are calculated or measured. The interaction state parameters include the mutual orientation and configuration of interacting molecules, the quantum states of each interacting molecule, and the momentum of each interacting molecule, and the probability of interaction as a function of all interaction state parameters. The interaction state parameters may be calculated by the methods of quantum chemistry. The interaction state parameters may be measured using spectroscopic methods. The multi-dimensional spectroscopy method described herein is a suitable method. Other multi-dimensional spectroscopy methods may be used. In general a large number of interaction states and associated sets of parameters are possible. Next, a set of initial states is calculated wherein each initial state includes the orientation, configuration, position, momentum and quantum state of each molecule. The set of initial states for each molecule type may for example be calculated using the methods of statistical mechanics and the initial state of the system is the combination of initial states of all molecule types. The initial states may for example include constraints due to substrate interactions. Next, the algorithm calculates the magnitude and direction of a sequence of disturbances required to transition each initial state into the plurality of interaction states under the constraint that the disturbances are selected to be within the operating range of the physical implementation. It should be noted a single disturbance may, in some cases be sufficient to transition one molecule type from an initial state to an interaction state, but the single disturbance will not in general transition a second molecule type from an initial state to a transition state. Generally, a sequence of disturbances acting on different dynamical properties of different molecule types is required.

In an embodiment that may be used in combination with any of the preceding or following embodiments, a second sequence of disturbances is generated from a first sequence of disturbances with a genetic algorithm. Specifically, the genetic algorithm iteratively modifies a portion of the first sequence of disturbances to produce a trial sequence of disturbances and then measures the effect of the trial sequence of disturbances upon the interaction of a first molecule and a second molecule. The trial sequence may increase or decrease the number of disturbances in the sequence. The trial sequence may include changes to the magnitude of any component of an individual disturbance vector wherein the disturbance vector is comprised of three dimensional magnitudes for acoustic, electric and magnetic fields. The trial sequence may include modification of a plurality of components of a disturbance. The trial sequence may include modification of a plurality of disturbances in the first sequence of disturbances. The algorithm compares the measured effect of the trial sequence of disturbances with the measured effect of the first sequence of disturbances and sets the second sequence of disturbances to that sequence that produces the most desired result. The measurement may be made for example by a multi-dimensional spectroscopy method. For example, the most desired result may be the enhancement of the interaction rate between a first molecule type and a second molecule type. The process may be repeated any number of times by setting the first sequence of disturbances in the following step to the second sequence of disturbances determined in the current step. The number of steps may be limited by an end condition. The end condition may be that a threshold interaction rate is reached, no change in interaction rate is found for a threshold number of iterations, or a threshold number of iterations are exceeded.

In an embodiment that may be used in combination with any of the preceding or following embodiments, an electrode linked with voltage supply is shaped to act as a Fresnel lens for radiation entering or exiting the interaction volume where the Fresnel lens is used to focus incident radiation to a point within the interaction volume while generating a spatially uniform electric field within the interaction volume.

According to a second aspect of the invention there is provided a method for applying a sequence of electromagnetic temporally varying perturbations to molecules in an interaction volume;

wherein an electrode linked with a voltage supply is shaped to act as a Fresnel lens for radiation entering or exiting the interaction volume where the Fresnel lens is used to focus incident radiation to a point within the interaction volume while generating a spatially uniform electric field within the interaction volume.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

FIGS. 1 to 8D below are taken from a co-pending application filed contemporaneously herewith identified above as the MDS patent and is included to set out the concepts and methods to be used herein.

FIG. 1 is a schematic illustration of an arrangement for multi-dimensional spectroscopy using methods to be used in the method according to the present invention.

FIGS. 2A, 2B, 2C, 2D and 2E show the interaction of an oriented molecule with incident radiation.

FIG. 4A is a schematic isometric view of a second sample cell and spectroscopy arrangements for measuring spectra of molecules in the sample cell using methods to be used in the method according to the present invention.

FIG. 4B is a side elevational view of the sample cell of FIG. 4A.

FIG. 4C shows a set of electrode voltage configurations for the arrangement of FIG. 4B.

FIG. 6A shows a series of configurations of a sample molecule.

FIG. 7 illustrates the temporal response of molecular orientation to a pseudo-random sequence of electric fields.

FIGS. 8C and 8D illustrate respectively the effect of applying a sequence of disturbances to a first type of molecule and a second type of molecule that contain the same molecular fragment.

DETAILED DESCRIPTION

Embodiments of the present disclosure are described in detail with reference to the accompanying drawings. Detailed descriptions of constructions or processes known in the art may be omitted to avoid obscuring the subject matter of the present disclosure. Further in the following description of the present disclosure, various specific definitions found in the following description are provided to give a general understanding of the present disclosure, and it is apparent to those skilled in the art that the present disclosure can be implemented without such definitions.

Figure 9:
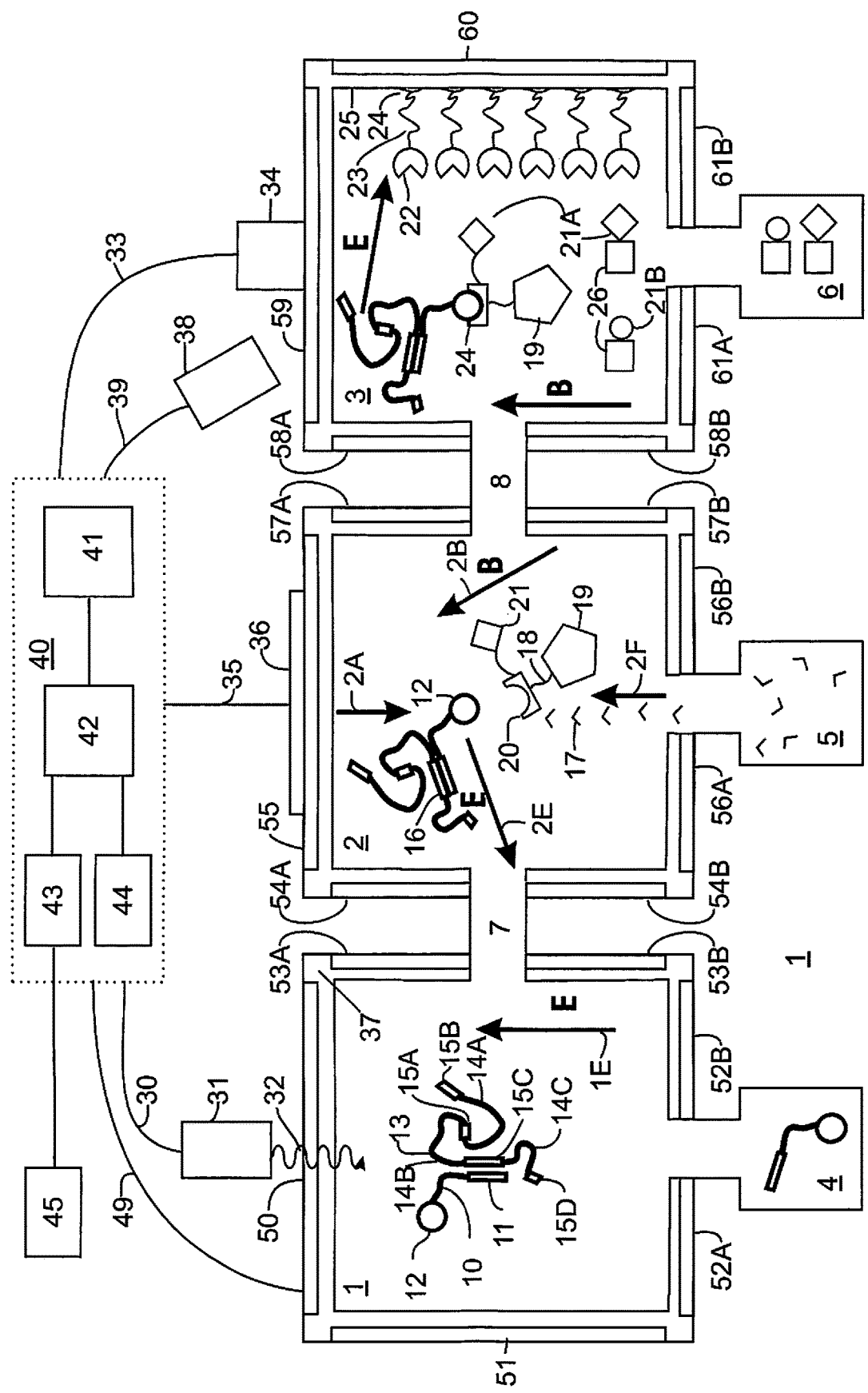
FIG. 9 is a schematic illustration of an arrangement for use in directed orientation chemical kinetics according to the present invention.

An arrangement for directed orientation chemical kinetics is indicated generally at 1000 in FIG. 9. Three interaction volumes 1, 2, and 3, are shown, each illustrating different features of the invention described in more detail below.

Interaction volume 1 illustrates the interaction of two molecule types manipulated with electric fields only.

Interaction volume 2 illustrates the interaction of two molecule types wherein a first type is positioned and oriented by electric fields and a second type is positioned and oriented by magnetic fields via attachment to a magnetic object.

Interaction volume 3 illustrates the interaction between a molecule attached to a fixed substrate and molecules positioned and oriented by an electric field or a magnetic field. As shown the interaction volumes may be linked together to perform a sequence of N reactions and/or interactions between molecules where N is greater than or equal to one. For example, the arrangement of the invention could be used to assemble the molecular machinery of an artificial cell wherein N is greater than 1000. Each interaction volume is in communication with and controlled by control means 40. For simplicity each feature is shown only once, but in general may be operable in any combination in each interaction volume. Further, connection to the control means is shown only once for each feature. It is understood that each like feature is also connected to the control means 40. Schematic 1000 represents a three dimensional fluidic network of interaction volumes, reservoirs and channels. The three dimensional fluidic network may the network described in the above cited FPFA patent by the current inventors.

Interaction volume 1 is enclosed by walls formed with an insulating material 37 with electrodes 50, 51, 52A and 52B, and 53A and 53B abutting or embedded in the insulating material. Insulating material 37 prevents the flow of electrical current from or to an electrode. In some embodiments charge transfer is desirable and the insulating layer may be omitted. It should be noted that the parts labeled with a common number and a letter are parts of the same entity. For example, electrodes 52A and 52B may be considered parts of a common planar structure with an aperture in the center. If the illustration were rendered in an xz plane above or below the aperture, there would not be a gap between sections 53A and 53B. A DC voltage is applied between electrodes 52A and 52B and electrode 50 to generate a bias electric field in the direction indicated at 1E. As indicated at 49, electrode 50 and all other electrodes in the schematic are in communication with control 40, which regulates the timing and amplitude of voltage applied to each electrode.

Control 40 includes an analog interface 41, a computation unit 42, a machine readable information storage device 44, and a communication port 43 operable to communicate with an external logic device 45. All functional units within control 40 are interconnected. The analog interface unit may include an analog to digital converter (ADC) and a digital to analog converter (DAC) as well as associated amplifier circuitry. For example, the amplifier circuitry many boost the voltage at electrodes transmitted over cable 49 from κV generated by commercially available DAC devices to 100V required to produce an electric field of 1,000,000 V/m between electrodes separated by 100 microns. The computation unit 42 may be any analog or digital computing device, for example a FPGA or a microprocessor. The machine readable storage may be any combination of persistent and non-persistent storage. For example, the machine readable storage may be a combination of RAM, a magnetic hard drive and an optical drive. Other types of storage may be used. Communications port 43 is any device that functions to transmit and/or receive information from an external logic source. Port 43 may for example connect with external logic device 45 over an internet connection.

Interaction volume 1 contains a first type of molecule indicated at 10 with region 11 that interacts strongly with the applied field and a weakly interacting region 12. The strongly interaction region 11 could for example be a helical region of a protein with a net dipole moment. A reservoir containing first type molecules in fluid communication with interaction volume 1 is indicated at 4. Flow between reservoir 4 and interaction volume 1 may be regulated with gate and pump structures described more fully in the above cited FPFA patent. Interaction region 1 also contains a second type of molecules as indicated at 13. The second type of molecule includes dipole regions of various sizes as indicated at 15A, 15B, 15C and 15D joined by weakly interacting chains as indicated at 14A, 14B and 14C. The weakly interacting chain 14A 14B 14C may for example be an aliphatic chain. Each segment may orient in relation to electric fields indicated at 1E with motion constrained by neighboring segments such as weakly interacting chain 14A 14B 14C. For example, rigid segment 15C may have a dipole moment along the segment axis which interacts with the electric field to produce a force toward alignment with the electric field. The dipole interaction force toward alignment may be resisted by flexible segments 14B and 14C together with solvent effects. The dynamics of the alignment of a segment dipole moment with the applied electric field depend on the mass and moments of inertia, the magnitude and direction of the dipole moment relative to the applied electric field, and restraining forces due to solvent and neighboring segments. For example, segment 15D having a smaller mass and moment of inertia than segment 15C may align with an applied electric field faster than segment 15C. In general, the rate at which each segment 15A, 15B, 15C and 15D orients in relation to an applied electric field may be different.

A temporally varying voltage is applied between electrodes 51 and 53A, 53B to generate a fluctuating electric field of higher amplitude than the bias DC field. Low mass regions as indicated at 15D respond in phase with the fluctuating electric field whereas high mass regions indicated at 15C are over-driven and oscillate with low amplitude about the bias field direction. Region 11 of molecule 10 has similar mass to 15C and aligns on average with the DC field. Regions 11 and 15C are therefore brought into similar alignment by the applied electric fields for interaction whereas regions of type 12 or 15A or 15B or 15D are not aligned for interaction. In a thermal system, regions 11 and 15C would each re-orient over a range of solid angles described by a sphere. With the applied electric fields, each molecular fragment 11 and 15C re-orient over a small range of solid angles close to the angles for mutual interaction making interaction more probable. Put another way, the reaction kinetics are accelerated due to electric field orientation.

As indicated at 31, a light source in communication with control 40 over cable 30 may direct electromagnetic radiation 32 into interaction volume 1. The electromagnetic radiation can have several effects. The electromagnetic radiation may ionize a molecule generating charged species with different dynamical properties in the applied electric fields than uncharged species. For example, photo-ionization may be used to concentrate one molecular species type proximate to an electrode, thereby increasing local concentration and probability of interaction. For example, by charging electrodes in a sequence, charged molecular species may follow a generally circular path. The total path length and hence the number of possible interaction partners is increased relative to thermal motion alone: that is the electric fields increase the reaction rate. The electromagnetic radiation may excite molecular motions and re-orientation on length scales and frequencies that are inaccessible to excitations by the electrodes. For example, electromagnetic radiation may excite a femto-second methyl group reorientation whereas excitations using the electrodes are at microsecond time scales. As the probability of photon absorption depends on the orientation of the applicable transition dipole moment, application of electric fields that alter molecular orientation regulate the probability of photon absorption. The electromagnetic radiation may selectively generate a reactive excited state in molecule 10 or 13. For example, the electromagnetic radiation may drive a photo-polymerization process and the applied electric fields direct the direction of polymer growth by orienting the reactants. The electromagnetic radiation may excite a carrier molecule that transfers a part of the excitation energy to reactant molecules.

Products formed in interaction volume 1 can be transported to interaction volume 2 through channel 7 linking the interaction volumes. Channel 7 may include gates that regulate flow and pumping mechanisms that produce a local pressure gradient as described in the above cited FPFA patent. Alternately a pressure gradient may be applied externally to drive molecules from interaction volume 1 to interaction volume 2 along channel 7. As indicated at 16, molecules 10 and 13 are joined by interaction between segments 11 and 15C into a single unit that is transferred to interaction volume 2. A sequence of electric fields as indicated at 2E are generated in interaction volume 2 by applying a sequence of voltages to electrodes 54A, 54B, 55, 56A, 56B, 57A and 57B by control 40. As described previously for interaction volume 1, the sequence of electric fields is operable to orient and position molecular complex 16 in interaction volume 2.

A sequence of magnetic fields is externally applied to interaction volume 2 as indicated at 2B. The externally applied magnetic fields may for example be generated by a field programmable analog array as described in the above cited FPAA patent. The sequence of magnetic fields interacts with complex magnetic object 19 to position and orient the complex magnetic object (CMO) as described in more detail in the above cited MG patent by the current inventors. Reactive molecular fragments 20 and 21 are tethered to the CMO 19 as indicated at 18. The schematic representation is not to scale: the CMO 19 is typically hundreds to thousands of times larger than the attached molecular fragments 20 and 21. This is because there is a minimum size for thermodynamically stable magnetic domains.

Solvent molecules 17 may be transferred to interaction volume 2 from reservoir 5 with flow momentum as indicated at 2F. The transfer of solvent molecules 17 may for example by regulated by positioning and orienting magnetic objects as described in the FPFA patent. As shown, the flow momentum is incident upon reactive segment 20, thereby influencing the orientation of reactive segment 20. In addition to momentum transfer through flow, solvent molecules can enhance the mobility of segments in biopolymer chains. Solvent molecules are in shallow potential energy wells and can be displaced by a biopolymer segment with less energy than is required to overcome the hindrance of covalent bonds between segments.

As shown, acoustic transmitter 36 is connected with control 40 via cable 35 operable to direct a sequence of ultrasonic waves into interaction volume 2. The ultrasonic waves are transmitted via molecular collisions, principally between solvent molecules 17. In the presence of an acoustic field, the momentum vectors of molecules are preferentially in the propagation direction of the acoustic wave. Hence, acoustic waves in interaction volume 2 may be used to transfer directional momentum to side group 12 of molecular complex 16 via solvent molecule collisions. The momentum and energy transfer from acoustic excitation causes side group 12 to cycle through a series of configurations which may interact with reactive segment 20.

In summary, interaction of reactive segment 12 with reactive segment 20 is enhanced in the scheme of interaction volume 2 as follows. Firstly, the sequence of electric fields operating on aggregate 16 limits the range of configurations available to segment 12 attached to aggregate 16 to a small subset of configurations available to segment 12 in a system at thermal equilibrium in the absence of applied electric fields. Secondly the sequence of magnetic fields operating on CMO 19 sets the orientation and position of CMO 19 and limits the configurations available to reactive segment 20 to those permitted by bending of tether 18. The range of configurations available to reactive segment 20 in the presence of the magnetic field and tether to CMO 19 is a small subset of the configurations available to reactive segment 20 by itself in a system at thermal equilibrium. Hence by selection of appropriate electric and magnetic field sequences, reactive segments 12 and 20 can be manipulated to configurations proximate to a mutual configuration for interaction. Thermal excitations can sample the restricted configuration space to find an interaction configuration faster than thermal excitations can sample the unconstrained configuration space to find an interaction configuration. Hence configuration constraints caused by the electromagnetic fields increase the reaction rate relative to the same reactants in a system at thermal equilibrium. Further, pseudo-random fluctuations in the applied electric fields may be used to sample the already constrained sample space faster than would be possible with thermal fluctuations alone. Further excitation by either acoustic wave or flow causes the configuration space to be sampled at a higher rate further increasing reaction rate.

Products of interaction volume 2 may be transferred to interaction volume 3 through channel 8. The product may for example be tethered to a CMO 19, in which case the product may be moved by applying a sequence of magnetic fields to draw CMO 19 into interaction volume 3. The rate of transport will depend upon the mass tethered to CMO 19 and possible forces due to electric field interactions. That is each molecule or aggregate type in interaction volume 2 has different mobility under the influence of electromagnetic fields and the different mobility may be used to effect separation. For example, the electric and magnetic forces may balance and cancel for a first molecule type and that type is retained in interaction volume 2. For example, the electric and magnetic forces may be in different directions causing different molecule types to separate in two dimensions. For example, the channel 8 may be long enough that different molecule types arrive at interaction volume 3 at different times.

As shown interaction volume 3 is surrounded by electrodes 58A, 58B, 59, 60 and 61A, 61B which are operable to generate electric fields in any direction in accordance with voltage applied to each electrode by control 40. Electromagnets 34 in communication with control 40 via cable 33 may be placed proximate to the interaction volume. The electromagnets may be fixed coils or the programmable coils as described in the above cited FPAA patent. A measurement means 38 in communication with control 40 via cable 39 is operable to measure one or more properties of molecules in interaction volume 3. The measurement may for example be a spectrometer and spectra are analyzed by control 40 to determine the presence or concentration of a molecule type. The measurement may for example measure temperature, pressure, pH, or conductivity.

The edge of interaction volume 3 proximate to electrode 60 includes fixed substrate 25 with a block co-polymer attached comprising a foot region 24 that binds to substrate 25, tether 23, and recognition complex 22. Recognition complex is capable of interacting with substrate of the type shown at 21. The foot attachment to the substrate may for example be by chemisorption or physisorption. The block copolymer is fashioned such that steric hindrance and mutual repulsion between recognition complexes orients the recognition complexes with active region 22 aligned on average with a normal to surface 25. The number of possible configurations of the recognition complex 22 is limited to those within a small solid angle proximate to the surface normal. As shown at 24 an aggregate comprising aggregate 16 and the group attached to CMO 19 includes substrate 21A. Aggregate 24 may have alternate forms (not shown) in which substrate 21A is replaced by substrate 21B. Aggregate 24 may be oriented and positioned by a sequence of electric and magnetic fields so as to position substrate 21A (or 21B) proximate to recognition complex 22 and to orient substrate 21A (or 21B) close to a mutual configuration for interaction between recognition complex 22 and substrate 21A. The number of possible configurations of substrate 22 is thus constrained to a small fraction of the configurations that would otherwise be available in a system at thermal equilibrium in the absence of electromagnetic fields. Both the recognition complex and the substrate have a constrained set of possible configurations and thermal excitations permute the mutual configuration of recognition complex 22 and substrate 21A until an interaction occurs, or does not occur in the case of substrate 21B. The interaction can be much faster in this arrangement than in a system at thermal equilibrium because fewer mutual configurations need to be sampled to test for interaction. The reaction rate may be further enhanced by applying electromagnetic fields that increase the transition rate between configuration states within the constrained configuration space. Measurement means 38 detects whether the interaction occurs in the case of 21A or does not occur in the case of 21B. The interaction may for example be detected by a change in spectra or by fluorescence enabled (or disabled) by interaction.

A reservoir 6 is in communication with interaction volume 3 contains sample molecules 26 that may or may not include substrate 21. A sequence of electric fields acting on molecule 26 orient substrate region 21A or 21B relative to recognition complex 22, thereby reducing the number of mutual configurations that need to be sampled by thermal excitations for an interaction (if any) to occur. An interaction occurs if the substrate is of type 21A and does not occur if the substrate is of type 21B. The recognition complex may for example be a single strand of DNA or a strand of RNA. The substrate may for example be a single strand of DNA that is either complimentary to the recognition complex in case 21A or not complimentary in case 21B.

The arrangement of FIG. 9 may be used to perform medical diagnostic tests. A user at external device 45 may for example issue instructions through port 43 specifying sequence interaction volumes, reagents supplied to each interaction volume and a sequence of electrical and magnetic fields applied to each interaction volume. The measurement means 38 measures a property of molecules in an interaction volume to give a test result.

The following description is taken from the above cited MDS patent and is included herein verbatim for completeness. That is, an arrangement for multi-dimensional spectroscopy which can be used to obtain data about the molecules to enable the orientation of the molecules to obtain the improved probability of interaction is indicated generally at 100 in FIG. 1 and is described as follows. The concept illustrated in FIG. 1 provides a multi-dimensional spectroscopy method wherein a target molecule in an initial configuration is perturbed by a temporal sequence of disturbances to generate a temporal sequence of perturbed configurations and one or more properties of the target molecule are measured for at least one perturbed configuration.

Figure 1:
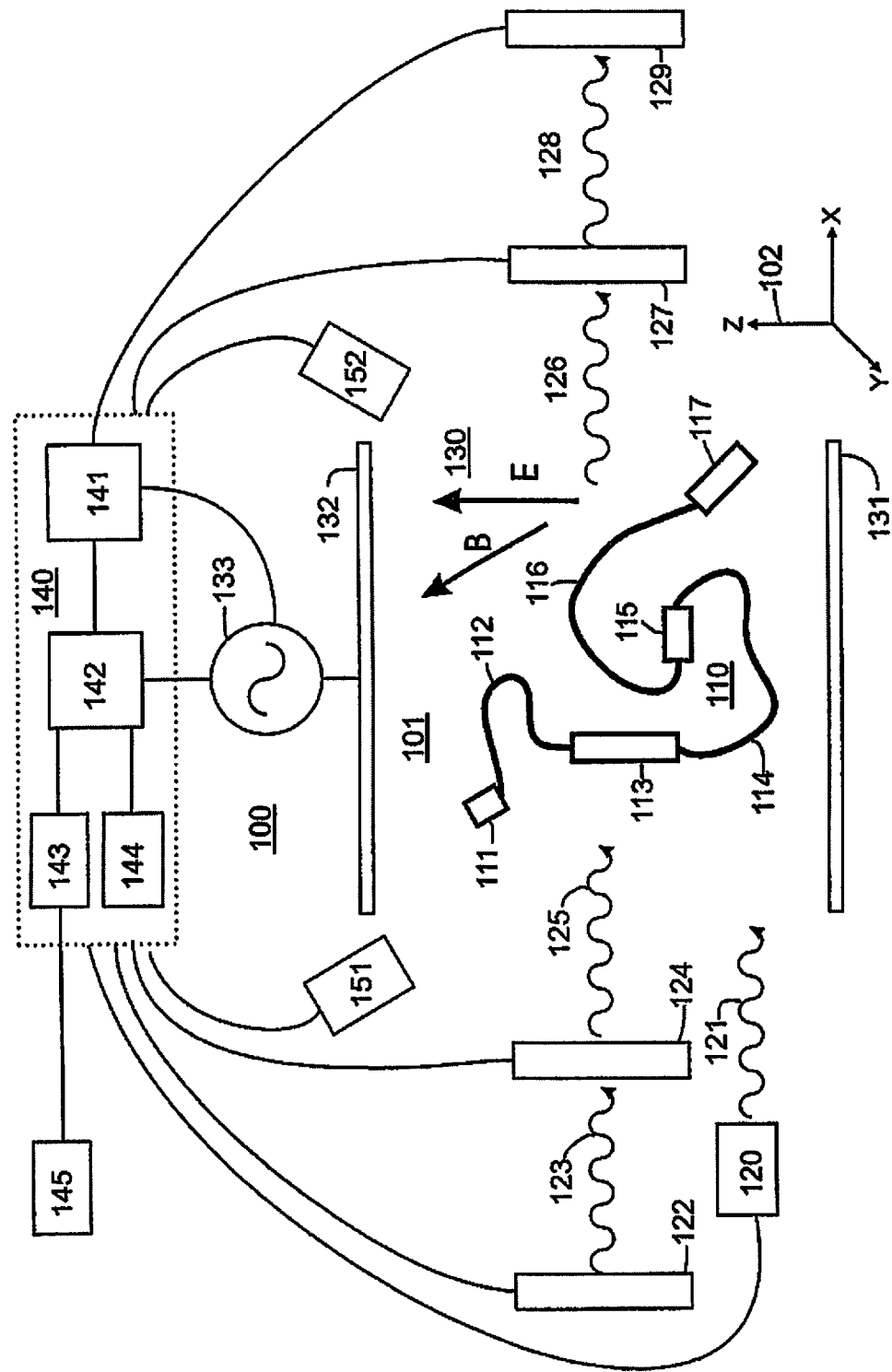

An arrangement for multi-dimensional spectroscopy is indicated generally at 100 in FIG. 1. A volume containing a collection of sample molecules is indicated generally at 101 with apparatus to generate electromagnetic fields in the sample volume indicated generally at 130. The apparatus 130 to generate electromagnetic fields may for example be a field programmable analog array as described in the above cited FPAA patent. As shown an electric field is generated between plate 131 held at a reference voltage and plate 132 in communication with voltage source 133. Voltage source 133 produces a temporal sequence of voltages according to signals received from computation device 142 of control 140. The voltage difference between plates 131 and 132 may for example peak at 10 volts with a separation of 10 microns to give maximum electric field strength of 1,000,000 V/m. Other voltages and separations may be used. As indicated at 102, the electromagnetic field apparatus 130 may be three dimensional and operable to generate electric and magnetic fields with components in any direction.

A representative sample molecule 110 consists of rigid segments 111, 113, 115 and 117 joined by flexible segments 112, 114, and 116. Each segment may orient in relation to electric and magnetic fields indicated as E and B generated by electromagnetic apparatus 130 with motion constrained by neighboring segments. For example, rigid segment 113 may have a dipole moment along the segment axis which interacts with the electric field to produce a force toward alignment with the electric field. The dipole interaction force toward alignment may be resisted by flexible segments 112 and 114 together with solvent effects. The dynamics of the alignment of a segment dipole moment with the applied electric field depend on the mass and moments of inertia, the magnitude and direction of the dipole moment relative to the applied electric field, and restraining forces due to solvent and neighboring segments. For example, segment 111 having a smaller mass and moment of inertia may align with an applied electric field faster than segment 113. For example segment 115 may align slowly due to resistive forces from segments 114 and 116. In general, the rate at which each segment 111, 113, 115 and 117 orients in relation to an applied electric field may be different. Spectra of the sample molecules may be measured at different stages of temporal evolution of orientation. Probe radiation source 122 emits radiation 123 which may be polarized by polarizer 124 to produce polarized radiation 125 incident on sample molecule 110. Interaction radiation 126 exits the sample region after incident radiation 125 has interacted with sample molecules 110. Interaction radiation 126 may have a wavelength dependent change in amplitude due to absorption. Interaction radiation 126 may be Raman scattered at wavelengths different from incident radiation 125. Interaction radiation 126 may be emitted by sample molecules 110, for example fluorescence. Interaction radiation 126 may pass through a polarization analyzer 127 and radiation with a selected polarization 128 is measured by a measurement device 129. Measurement 129 device may simply measure the amplitude of radiation 128. Measurement device 129 may be a spectrometer that measures the amplitude of radiation 128 as a function of wavelength.

States of sample molecule 110 may be manipulated prior to measurement by application of "pump" radiation 121 from radiation source 120. Pump radiation may interact with sample molecules 110 or parts thereof to produce excited states giving sample molecule 110 a time dependent (as the excited states relax) spectrum. Pump radiation 121 may also induce a change in the charge distribution of sample molecule 110, which in turn alters the dynamic response of sample molecule 110 to temporally varying electromagnetic fields. That is pump radiation may alter both the spectrum of sample molecule in a stationary frame of reference and the sequence of orientations of sample molecule 110 in a temporal series of measurements.

As indicated at 151, an acoustic transmitter may direct ultrasonic waves into the sample region 101. The ultrasonic waves may interact with sample molecules 110 and subsequently be measured with acoustic analyzer 152. Preferably acoustic measurements are made in directions parallel to the direction of molecular motion and perpendicular. The parallel measurement may exhibit a Doppler shift in frequency relative to the perpendicular component. The direction of motion may be set by the directions of a sequence of applied electromagnetic fields. As indicated by the cable links, the transmission and reception of acoustic waves are coordinated by control device 140. Each segment of sample molecule may reorient in response to a temporal sequence of electromagnetic fields at different rates. For example, the motion of segment 115 may cause a Doppler shift in the frequency of reflected acoustic waves measured by acoustic analyzer 152. This measurement is complimentary to the polarization dependent spectral measurements. That is the spectral measurements provide information about the position (orientation) of a molecular segment and the acoustic measurements provide information about the velocity of a molecular segment. Acoustic waves may also be used as a pump pulse to change the state of a sample molecule prior to, or during as sequence of spectroscopic measurements. For example, an acoustic wave is transmitted by molecular collisions along a propagation axis. Such collisions may for example disrupt ordering of structured solvent molecules such as water proximate to a sample molecule, thereby altering the spectral response of the sample molecule.

Signals from measurement device 129 are transmitted to signal analyzer 141 integral to control device 140 together with signals from voltage source 133. Signal analyzer 141 may for example be a spectrum analyzer or a lock in amplifier that temporally correlates each signal from measurement means 129 with the voltage source 133 (and by extension electric field). The temporal correlation may be performed for each wavelength measured. Multi-dimensional spectra may be assembled by adding temporal dependence, polarization dependence, excitation dependence and electromagnetic fields to wavelength-amplitude spectra. Signal analyzer is in communication with computation device 142 which may assemble and analyze multi-dimensional spectra. The multi-dimensional spectra may be stored in a machine readable storage means 144 or transmitted via communication port 143 to an external computation device 145.

FIG. 2A shows a molecular segment 213 with axis D as shown at 214 aligned with an applied electric field E. The molecular segment 213 has, at the measurement time $t_0+T_1$, the same orientation relative to the applied electric field as segment 527 in FIG. 5. Molecular segment 213 may include a plurality of transition dipole moments. The orientation of each transition dipole moment relative to the molecular segment axis D depends upon the respective wave functions of initial and final quantum states for the absorption of a photon. In general, the transition dipole moments are not parallel to the molecular segment axis D. Although this example pertains to absorption from fixed transition dipole moments, the methods described also apply to scattering (Raman, Brillouin) and non-linear optical effects. Two example transition dipole moments $d_i$ and $d_{i+1}$ are shown at 215 and 216, respectively. The probability for the absorption of a quantum of electromagnetic radiation (a photon) depends upon the dot product between each transition dipole moment and the electric field of incident electromagnetic radiation. In this example, the electric field of electromagnetic radiation incident in the y-direction may oscillate in the x-direction, z-direction, or any combination thereof as shown at 230 of FIG. 2B. In general the electric field of incident electromagnetic radiation $E_i$ is polarized at angle θ relative to the x-axis at some instant in time as shown at 231. The polarizing element 124 as shown in FIG. 1 may rotate the polarization of incident probe radiation to any angle (or induce circular polarization). As the angle of polarization is scanned, the amplitude of absorption peaks at different angles for each transition dipole moment varies as illustrated in FIG. 2C by curves 235 and 236 for transition dipole moments $d_i$ and $d_{i+1}$, respectively. Curve 235 is higher than curve 236 because the magnitude of transition dipole moment $d_i$ is greater than the magnitude of transition dipole moment $d_{i+1}$ as best shown by the projections of each onto the xy plane as shown at 237 and 238 (FIG. 2A), respectively. As shown at 239, there is an angle Δφ between transition dipole moment projections 237 and 238 which may be resolved by directing probe radiation toward molecular segment 213 in the z-direction as indicated in FIG. 2D at 240 and rotating the axis of polarization φ relative the x-axis. FIG. 2E shows plots of the absorption amplitudes for $d_i$ and $d_{i+1}$ are shown at 241 and 242, respectively. In general, the absorption amplitude for each transition dipole moment will vary at each wavelength with θ and φ. The multi-dimensional spectrum of the molecular segment is a superposition of contributions from each transition dipole moment in the molecular segment. The multidimensional spectrum of a sample containing different molecular segment types is a superposition of spectra from each molecular segment type weighted by the abundance of each molecular segment type. Hence each point in θ, φ space has an associated spectrum comprised of amplitude and wavelength.

Figure 3B:
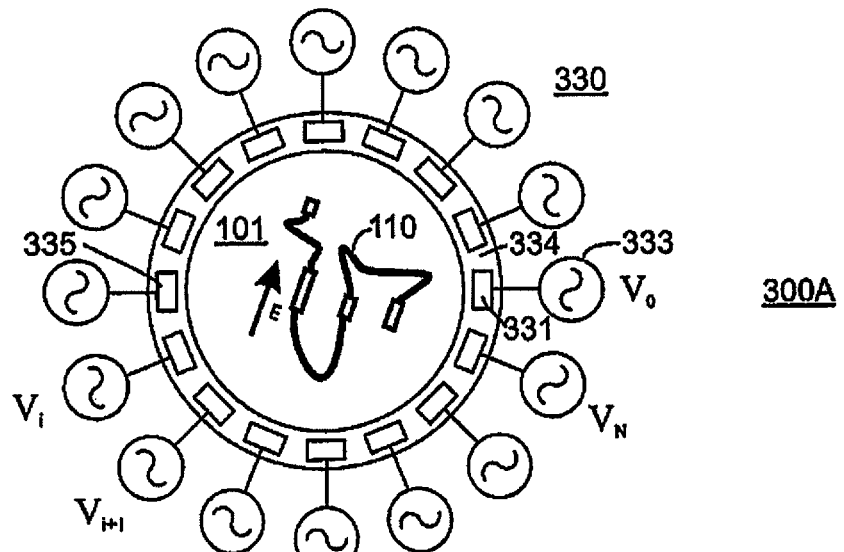
FIG. 3B is a cross-sectional view along the lines 3B-3B of FIG. 3A.
Figure 3A:
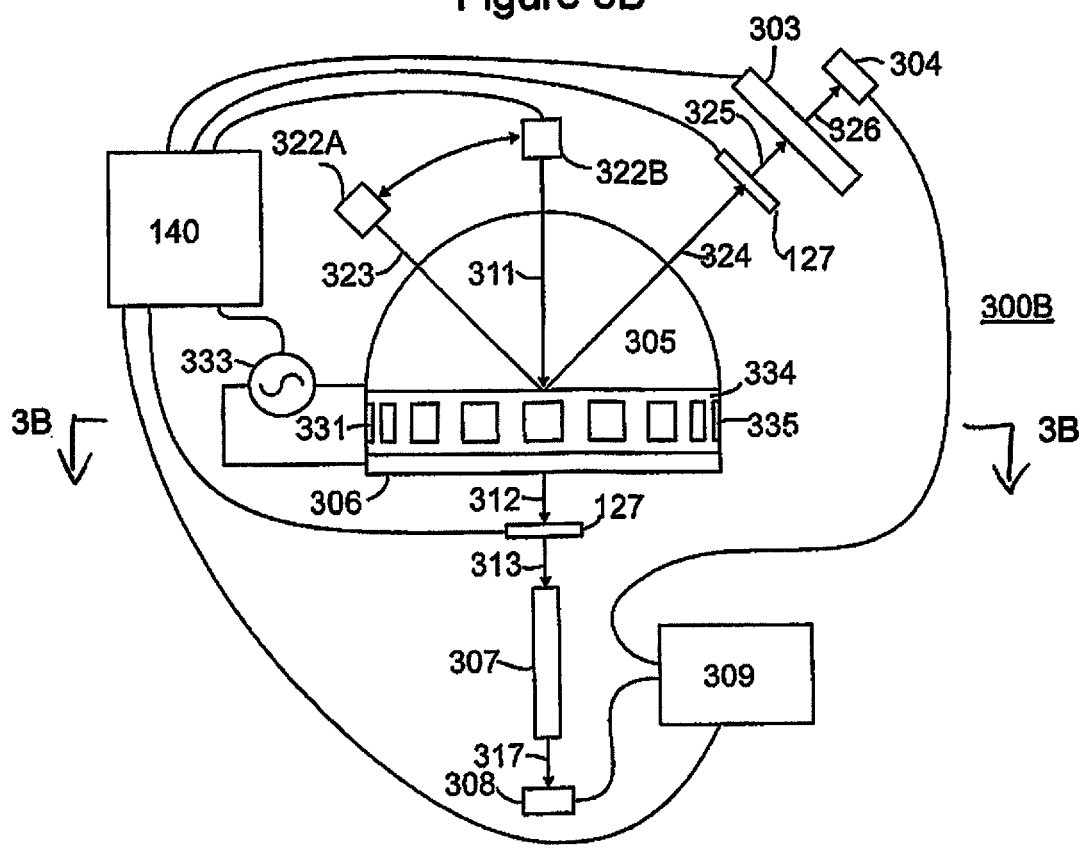
FIG. 3A is a schematic illustration showing a side view of the sample cell and two spectroscopy arrangements for measuring spectra of molecules in the sample cell according to the present invention.

FIGS. 3A and 3B show side and cross-section views for an example embodiment of the invention. FIG. 3B shows a cross-section lying in a xy section generally indicated at 300A through the sample volume as indicated at 101. An array 330 of electric field sources labeled from 0 to N is symmetrically arranged around sample volume 101 containing sample molecules 110. Each electric field source includes a voltage source 333 electrically connected with electrode 331. The electrodes 331 are enclosed in insulating material 334 preventing flow of electrical current. The voltage sources 333 may be controlled independently by control means 140 (connections not shown). The voltage sources 333 may for example include digital to analog converters (DAC) and amplifier circuitry. The DAC accepts digital codes from control means 140 and outputs a temporal voltage waveform. Amplifier circuitry then boosts the voltage of the DAC output to produce desired electric field strength. The electric field strength may for example be comparable to physiological electric fields measured across cell membranes on the order of several hundred kilo volts per meter.

In another arrangement, a DAC is connected by a MUX to a plurality of voltage sources 333. Other means for generating temporally varying voltages may be used.

In operation, control means 140 may for example transmit a sequence of control codes to voltage source 333 causing a temporal voltage waveform at electrode 331 with all other electrodes held at ground potential. In this case a temporally varying electric field symmetric about an axis between electrode 331 and its diametrically opposed electrode 335 is generated. The direction of the electric field axis may be changed by supplying a voltage waveform to a different electrode in the array 330. The shape and gradient of the electric field may be modified by supplying (possibly different) voltage waveforms to a plurality of the electrodes. In general the axis of the electric field generated by electrodes 331 is in the xy plane.

FIG. 3A shows a side view of the sample cell and schematically shows key components for two spectroscopic systems. FIG. 3B is the section between electrodes 331 and 335 indicated in FIG. 3A. The system is generally indicated at 300B and the sample cell region is drawn in three dimensions. A hemispherical internal reflection element (IRE) 305 is positioned above the ring of insulating material 334. The IRE 305 may for example be Si or Ge which can also serve as an electrode as shown by connection to voltage source 333. Internal reflection elements fabricated with other materials may be used. In some cases the IRE may have a thin layer of transparent conductive material on the bottom surface to form an electrode. The transparent conductive material may for example be Indium Tin Oxide (ITO). The surface of the IRE in contact with the sample volume is coated with a thin layer of insulating material (not shown) that prevents flow of electrical current. The thin layer of insulating material may for example be spin coated polystyrene. The bottom surface of the sample cell is a conductive window 306, which may optionally include a thin layer of insulating material. The window 306 may for example be fabricated from Si or Ge. Other materials may be used. Voltage source 333 receives digital signals from control means 140 and generates a temporally varying voltage difference between the top internal reflection element 305 and the bottom window 306. The voltage difference between IRE 305 and window 306 generates a temporally varying electric field oriented along the z-axis. The net electric field in the sample volume 101 is the vector sum of electric fields generated by electrodes 305, 306 and array 330 of electrodes 311. The arrangement shown in FIGS. 3A and 3B is useful for systems with cylindrical symmetry.

FIG. 3A schematically shows optical paths for a reflection arrangement and a transmission arrangement. For simplicity, optical elements such as mirrors lenses, and prisms normally used to direct, collect and focus radiation are not explicitly shown, but are understood to be present.

For the transmission arrangement spectral light source 122 from FIG. 1 is positioned on the symmetry axis of the IRE as shown at position 322B. Spectral light source 122 produces temporally modulated (preferably pulsed) broadband radiation 311 for this example. Probe radiation 311 passes through the IRE and enters the sample volume normally (angle of incidence 0 degrees). Probe radiation 311 interacts with sample molecules 110 and interaction radiation transmitted through the sample volume is collected and directed along path 312 through polarization analyzer 127. Control 140 rotates polarizer 127 to select a polarization directed on path 313 to optical dispersion device 307. Different wavelengths of polarized interaction radiation pass through optical dispersion device 307 at speeds determined by the refractive index for each wavelength and follow path 317 to detector 308. Each wavelength in the pulse of polarized interaction radiation arrives at detector 308 at a different time. The temporal photon flux at the detector is the temporal dependence by wavelength convoluted with the temporal pulse shape. Optical dispersion device 307 may for example be a long optical fiber wound around a cylinder for compactness. Detector 308 may for example be a photo-diode or a photo-multiplier tube. Electrical signals from detector 308 are transferred to temporal signal analyzer 309 in communication with control 140. The temporal signal analyzer may for example be a conventional analog to digital converter (ADC). Preferably the temporal signal analyzer is the device described in the above cited HRMS patent which provides better temporal resolution and a better signal to noise ratio than a conventional ADC.

For the reflection arrangement spectral light source 122 from FIG. 1 is shown at position 322A making an angle of incidence greater than zero with the IRE sample interface. The angle of incidence in this arrangement is adjustable and together with the refractive index of the IRE material controls the depth of penetration of an evanescent wave into the sample volume. Probe radiation is incident along path 323, interacts with sample molecules 110 via evanescent wave penetration into sample volume 101 and is reflected along path 324. The polarization of interaction radiation along path 324 is modulated by polarizer 127 receiving control signals from control means 140. Polarized interaction radiation continues along path 325 to spectrometer 303. Spectrometer 303 modulates radiation output along path 326 to detector 304, which may include a plurality of detection elements. Spectrometer 303 may for example be a dispersive grating spectrometer that directs each wavelength along a different path 326 to a different detector element of detector 304. Spectrometer 303 may for example be a Fourier Transform spectrometer operated in step scan mode. Spectrometer 303 may for example be the arrangement described in the above cited HEMS patent with a plurality of detector elements. Electrical signals from each detector element are transmitted to temporal signal analyzer 309 which quantifies the amplitude of each signal with respect to time and relays quantified signals to control 140.

For transmission and reflection measurements described above, the temporal evolution of the spectral signal at detectors 304 and 308 is correlated with the sequence of electric fields produced by electrode array 330, and electrodes 305 and 306 by control 140. That is the temporal sequence of electric fields produces a temporal sequence of perturbed sample molecule conformations and each perturbed conformation may give a different spectral signal.

FIGS. 4A, 4B and 4C shows a rectangular sample cell configured to generate temporally varying three dimensional electric fields in sample volume 101 generally indicated at 400. Each voltage supply indicated in FIGS. 4A and 4B, specifically 431, 432, 433, 434, 435, 436, 437, 438, 441, 443, 445, and 447 is in communication with and controlled by control means 140 indicated in FIG. 1. For simplicity connections to control means 140 are not shown in FIGS. 4A and 4B. In the region indicated at 401 the sample cell is drawn in perspective view in three dimensions. Structural elements and inner faces of the sample cell are comprised of electrically insulating material 403 which prevents flow of electrical current. In an alternate arrangement used for electrochemical studies (not shown), the electrodes may be positioned to allow electrical current flow in the sample volume. Three example electrode configurations are illustrated. The top panel electrode 421 linked with voltage supply 431 has an aperture 429 through which electromagnetic radiation may pass to or from the sample volume 101 as indicated at 411. The front panel illustrates another arrangement with four electrodes 422, 423, 424 and 425 and corresponding voltage supplies 432, 433, 434, and 435. Each electrode may be held at a different voltage to generate a spatially and temporally varying electric field in the sample volume 101. The gradient in a spatially varying electric field may be used for example to translate molecules via interaction with a molecular dipole moment. As indicated at 412, radiation may pass into or out of the sample volume through gaps between the electrodes. The electrodes 422, 423, 424, and 425 may be arranged to filter or diffract radiation as discussed in more detail within the above cited FPAA patent. Briefly, the electrodes may function to produce electric fields acting on molecules in the KHz to GHz range and act as optical elements for radiation interacting with sample molecules at THz and higher frequencies. The side panel electrode 426 linked with voltage supply 436 is shaped to act as a Fresnel lens for radiation entering or exiting sample volume 101 along path 113. In this example, the Fresnel lens may be used to focus incident radiation to a point within the sample volume while generating a spatially uniform electric field within the sample volume.

A cross sectional view of the sample cell in FIG. 4B is generally indicated at 402. In cross section it is seen that the electrically insulating material 403 encloses sample volume 101 with sample molecules 110 oriented by the electric field indicated at 404. The insulating material 403 is of sufficient thickness to prevent the flow of electrical current in sample volume 101. Further insulating material 403 may be shaped to limit the sample volume to an interaction volume in which the electric field is uniform within a threshold tolerance. As shown, voltage is applied from source 436 to generate a positive charge on electrode 426 (indicated by shading) and a negative charge on opposing electrode 427 via source 437. A perpendicular electric field component may be generated by applying different voltages at electrodes 421 and 428 via voltage sources 431 and 438, respectively. A series of example voltage configurations in the xz plane is illustrated in FIG. 4C at 451, 452, 453, 454, 455, 456, 457 and 458. Electrodes with positive voltage are shaded black. Each example represents one possible state in a temporal sequence of electric field states. Referring to the coordinate system given at 402, configurations 451 and 452 produce electric fields in the −z and +z directions, respectively. Similarly, configurations 453 and 454 produce electric fields in the −x and +x directions, respectively. Configuration 455 produces an electric field diagonal to the sample cell in the −x+z direction. Configuration 456 produces an electric field diagonal to the sample cell in the −x−z direction. Configuration 457 produces an electric field diagonal to the sample cell in the +x−z direction. Configuration 458 produces an electric field diagonal to the sample cell in the +x+z direction. In general, the sequence of electric fields includes at least two different electric fields that differ in direction by more than zero degrees and less than 180 degrees. For example, configurations 451 and 452 differ by 180 degrees, so a sequence including configurations 451 and 452 must also include at least one of configuration 453, 454, 455, 456, 457, or 458. Further, the magnitude of voltage (and electric field) may vary for each electrode activated.

Referring to FIG. 4B, voltage sources 441, 443, 445 and 447 may be configured to generate and measure voltage. In this case the voltage source may for example include DAC, ADC and amplifier circuitry. In transmit mode, the voltage source 441 receives a sequence of signals from the control means 140 and DAC circuits a temporally varying voltage causing transducer 442 to vibrate and generate an acoustic wave propagating into sample volume 101. In receive mode, transducer 442 vibrates under the influence of incident acoustic waves and generates a voltage received by ADC circuits in voltage source 441 which convert the voltage to digital form and transmit digital signals to control 140. Acoustic transducers 444, 446, and 448 together with their voltage sources 443, 445, and 447 operate in the same manner as transducer 442 and voltage source 441. The acoustic transducers may perform two distinct functions. Firstly, acoustic waves interact with sample molecules 110 via molecular collisions providing momentum transfer in the direction of wave propagation. Control 140 may activate a sequence of acoustic waves in concert with a sequence of electrical fields to effect a change in conformation of a sample molecule. That is the impulsive force from acoustic waves may overcome a potential energy barrier to conformational change wherein the energetically favorable conformations are determined by the electric fields. Secondly, acoustic waves may be used to probe molecular movement via Doppler shifts. In this mode, a sequence of electric fields causes a molecule or molecular fragment to move and an acoustic wave interacting with the moving molecule or molecular fragment is Doppler shifted. Since the velocity of acoustic waves is typically 5 orders of magnitude less than the velocity of light, the relative Doppler shift is larger and easier to measure.

Figures 5A, 5B:
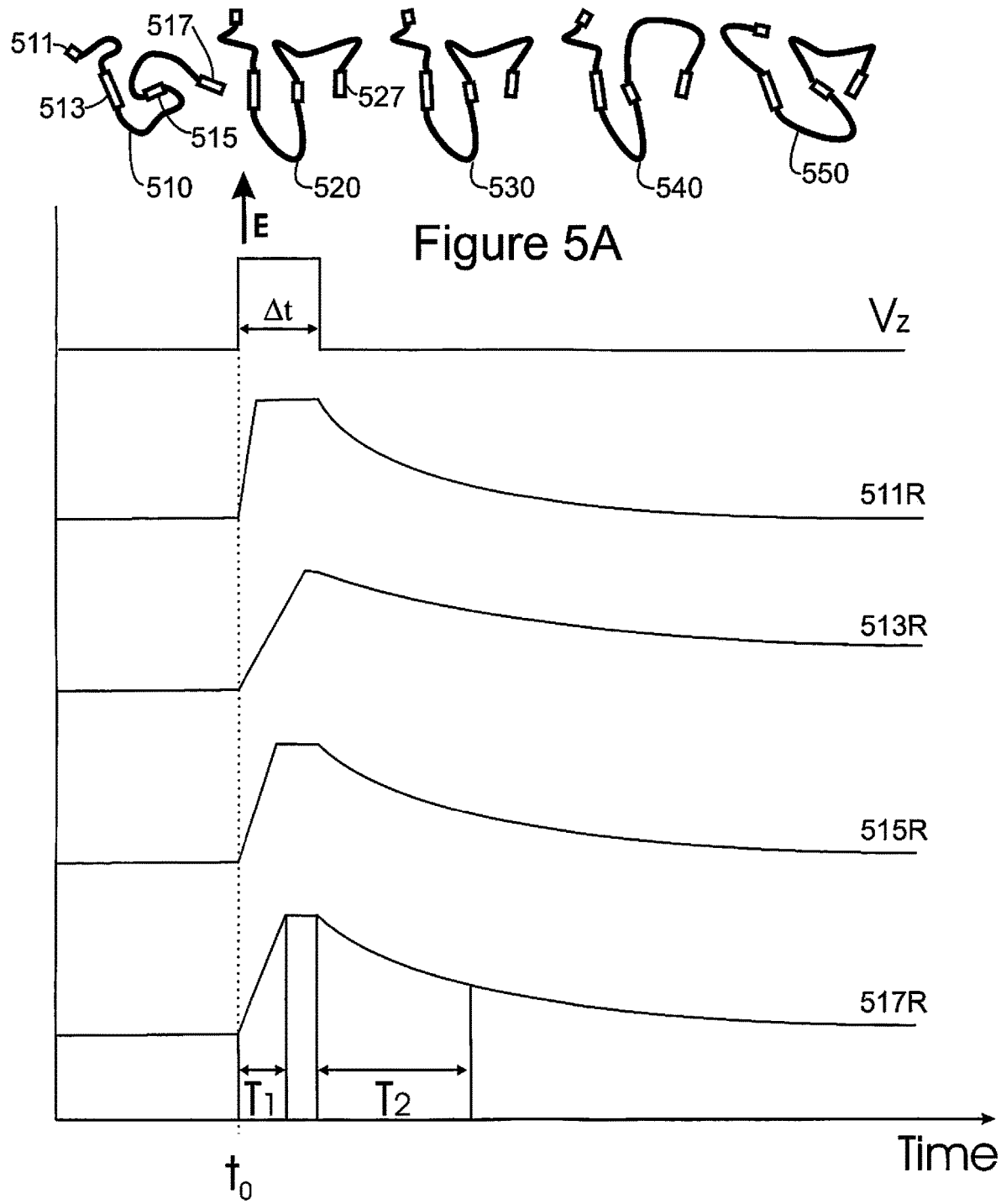
FIG. 5A shows a series of configurations of a sample molecule.
FIG. 5B illustrates the temporal response of the molecule of FIG. 5A showing the responses to the molecular orientation to an electric field impulse.
Figure 6B:
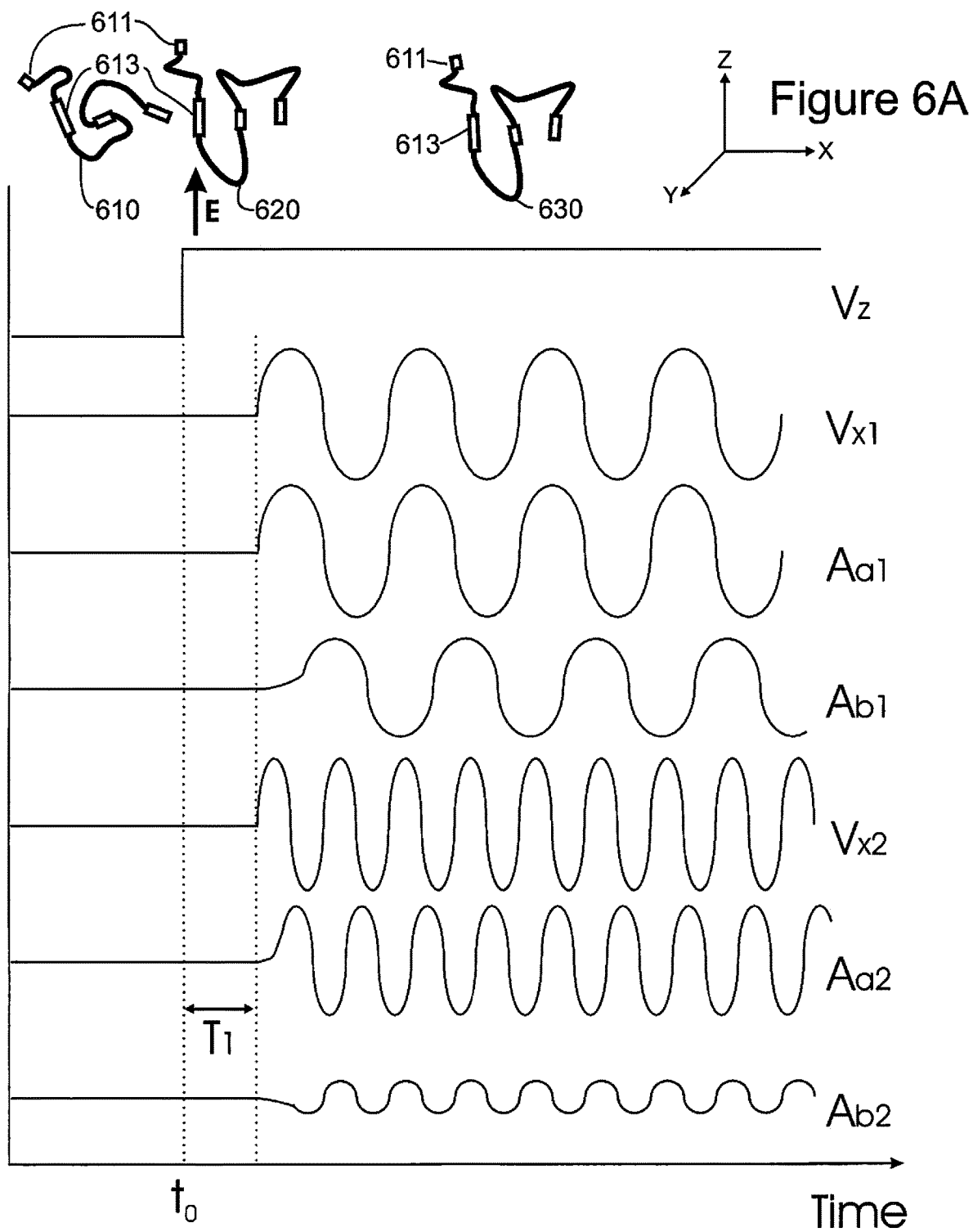
FIG. 6B illustrates the temporal response of the molecule of FIG. 6A showing the responses to the molecular orientation to periodic electric fields.
Figure 7:
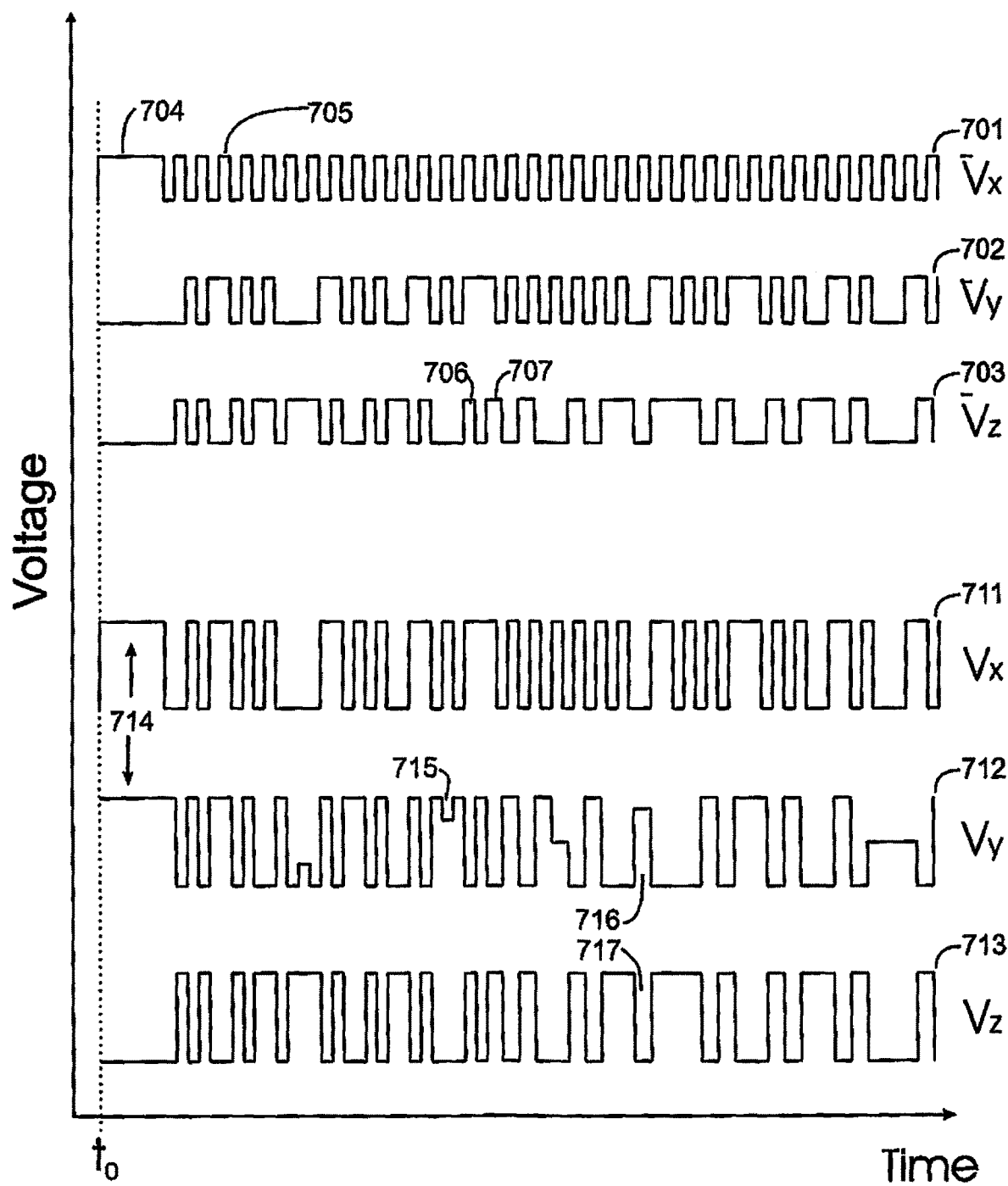

FIGS. 5B, 6B and 7 give simple non-limiting illustrative examples of electric field sequences that may be used with arrangement of FIG. 1 to produce spectra with dimensions of amplitude, wavelength (or frequency equivalent), temperature, polarization state, electric field amplitude and frequency, and temporal evolution. Complex sequences of electromagnetic fields may be applied to sample molecules to selectively enhance spectral signals from a first selected sample molecule or portion thereof and a second sample molecule. For example, a sequence of electromagnetic fields may include a pump pulse that alters the quantum state of a selected sample molecule and a subsequent electromagnetic field alters the configuration and/or orientation of the selected sample molecule due at least in part to electromagnetic interactions with the altered quantum state. For example, a sequence of electromagnetic fields may alter the configuration/orientation of a selected sample molecule in a way that a subsequent pump pulse selectively interacts with a first molecular transition and not with a second molecular transition of the same or similar energy. For example, the sequence of electromagnetic fields orients a first transition dipole moment parallel to the polarization of probe radiation and a second transition dipole moment perpendicular to the polarization of probe radiation. The transition energies of the first transition dipole moment and second transition dipole moment may be identical, but only the first transition dipole moment interacts with the probe radiation. If the polarization of the probe radiation is rotated by 90 degrees, only the second transition dipole moment interacts with the probe radiation. This contrasts with a sample at thermal equilibrium in which the first and second transition dipole moments are both randomly oriented and equally likely to interact with probe radiation of any polarization. While orthogonal alignment of the first and second transition dipole moments provides maximal spectral contrast between contributions from the two transition dipole moments, the spectral contrast for angles between average transition dipole moment orientations less than 90 degrees may provide sufficient spectral contrast to separate the spectral contributions of the first and second transition dipole moments. The spectral contrast between a first transition dipole moment and a second transition dipole moment may be enhanced by making a temporal series of measurements in which the average angle between the transition dipole moments varies with time. For example, the first and second transition dipole moments may each have a preferred orientation following a sequence of electromagnetic fields. After the electromagnetic fields are switched off, the average orientation of each transition dipole moment may decay to a random orientation at a different rate. The difference in orientation decay rate is sufficient to distinguish between the spectral contributions of each transition dipole moment. For example, the sequence of electromagnetic fields may include a plurality of pulses wherein the time between pulses is varied. A first transition dipole moment may retain residual orientation between successive pulses and become stepwise more oriented. A second transition dipole moment may become oriented by each pulse and decay to a random orientation between pulses. By varying the pulse rate, the spectral contributions of the first and second transition dipole moments may be separated based on the difference in dynamical properties.

FIG. 5B illustrates the differential orientation of molecular segments of FIG. 5A in response to an electric field impulse. The top curve in FIG. 5B indicated at 521 is a plot of voltage applied to generate an electric field in the z direction. The voltage is initially zero as indicated at 531 and increases to voltage $V_z$ at time to as indicated at 532. The voltage is applied for a time t as indicated at 533 and switched off at time $t_0+t$ as indicated at 534. As shown in FIG. 5A, molecule 510 with rigid segments 511, 513, 515, and 517 is initially in a disordered state. Spectra of molecules in the disordered state are independent of the direction and polarization of incident radiation. The projections of molecular segments 511, 513, 515, and 517 onto the z-axis as a function of time are given in curves 511R, 513R, 515R, and 517R, respectively. As indicated at 518 on curve 511R, the average orientation of segment 511 with respect to the z axis is zero: that is there is no preferred orientation. The molecular segments 511, 513, 515, and 517 each align with the applied electric field with a different characteristic time constant T1 as illustrated by curves 511R, 513R, 515R, and 517R, respectively. The temporal evolution of the configuration of molecule 510 is shown schematically at 520, 530, 540, and 550. After time t>T1 for all segments, all segments are aligned with the applied electric field as shown at 520. A short time after the electric field is switched off, the smallest segment 511 with the smallest mass and moment of inertia deviates from alignment with the z axis as shown at 530. The orientation of each segment decays with a characteristic time constant T2. As shown at 540, only segment 513 retains significant alignment with the z axis. As shown at 550, for times past T2 for all segments, the molecular configuration is random and different from the initial configuration. The time constant T1 depends upon the charge distribution, mass, moment of inertia, and interactions with neighboring molecules or parts thereof. For small molecules or un-entangled parts thereof, the time constant may be on the order of a pico-second or less. In some cases reorientation may require breaking covalent bonds of neighboring molecules or segments rendering alignment with the applied electric field energetically improbable: that is the time constant approaches infinity. In some cases there is a potential energy barrier to reorientation. In this case there will be a threshold applied electric field strength for which reorientation may occur. The threshold may have a statistical distribution for each segment type and each segment type may have a different distribution of threshold fields. Note that a threshold electric field is proportional to the activation energy for mobility determined by the interaction of the electric field with the charge distribution of the molecular segment. The interactions between molecular segments and neighboring molecules are constantly changing at a rate dependent upon the available energy. The available energy may be thermal energy, in which case the thermal energy is partitioned among the available modes according to the equipartition theorem and T1 is temperature dependent. Energy for reorientation may also be directed to selected modes, for example by exciting the selected modes with electromagnetic radiation. The time constant T1 may be calculated from a temporal series of spectra recorded with polarization parallel and perpendicular to the applied electric field direction. In the example shown, the parallel polarization is in the z direction and a perpendicular polarization is any direction in the xy plane. The parallel and perpendicular polarized spectra of a molecular segment are identical in the random state. When the electric field is turned on the difference between parallel and perpendicular polarized spectra may increase, asymptotically approaching a limiting value for each wavelength. T1 is taken as the time since the electric field is turned on for the spectral difference to reach a threshold fraction of limiting value. The threshold fraction may for example be 95%. In some cases, the applied electric field may induce a long range ordering of sample molecules that corresponds with a local or global potential energy minimum. In these cases the ordering (alignment) may be stable against thermal fluctuations and may require an applied electric field (not necessarily along the same axis) to disrupt the ordering. For the examples shown in FIG. 5A, thermal excitations are sufficient to disrupt molecular segment ordering. As shown, the curve 517R for segment 517 alignment with the z-axis (also measured with a series of polarized spectra) decays to 1/e of maximal alignment due to thermal excitations with a characteristic period T2.

In FIG. 6A a sample molecule 610 is initially in a random state with short segment 611 and long segment 613 having no preferred direction. As shown in FIG. 6B, at time t0, an orienting electric field with waveform Vz is applied in the z-direction causing segments 611 and 613 or the sample molecule to orient preferentially along the z-axis. Note that in general the orientation depends upon the distribution of charge in the molecular segment and is not necessarily along the direction of the applied electric field. Orientation in the direction of the electric field is for illustrative purposes only. At a time greater than T1 for segments 611 and 613 (orientation above a threshold value) a temporally varying electric field is generated in the x-direction perpendicular to the stationary z-direction field. The frequency of the temporally varying electric field is varied systematically with example waveforms Vx1 and Vx2 illustrating low and high frequency fields, respectively. The response of the short segment 611 to the low frequency field is given schematically in plot Aa1. Due to low mass and moments of inertia, segment 611 oscillates in the x-direction with large amplitude in phase with the applied field Vx1. Due to higher mass and moments of inertia, segment 613 oscillates with a phase delay and reduced amplitude as shown schematically in plot Ab1. Even if the spectral contributions of segments 611 and 613 are at the same wavelength and would be indistinguishable in the static case, the contributions of each segment may be separated on the basis of the phase difference between them with respect to the driving waveform Vx1 with a lock-in amplifier or spectrum analyzer. The amplitude and phase of spectral contributions from each segment change as the driving frequency is changed. For the driving waveform Vx2, the responses of segments 611 and 613 are shown schematically in plots Aa2 and Ab2, respectively. The spectral response for short segment 611 in plot Aa2 is phase shifted and reduced in amplitude compared with plot Aa1 due to the higher excitation frequency. As shown in plot Ab2, long segment 613 is over-driven at the higher frequency excitation Vx2 and consequently has a significant phase shift and reduced amplitude. The spectral contributions of segments 611 and 613 may again be separated with a lock-in amplifier or spectrum analyzer by for example varying the selected phase. The method of FIG. 6B gives multidimensional spectra with dimensions amplitude, wavelength (or frequency equivalent), excitation frequency, excitation amplitude, and response phase. In addition the sample temperature may be varied, which changes the inter-molecular and intra-molecular interactions and hence spectral response.

FIG. 7 shows two examples of three dimensional voltage excitation patterns for the arrangement of FIG. 4A. The first pattern consists of voltage waveforms 701, 702, and 703 generated by voltage sources 436, 432, and 431, respectively. The second pattern consists of voltage waveforms 711, 712, and 713 generated by voltage sources 436, 432, and 431, respectively. The waveform 701 or 711 is applied to electrode 426 to produce an electric field component in the x direction as shown at 401. The waveform 702 or 712 is applied to electrode 422 to produce an electric field component in the y direction. The waveform 703 or 713 is applied to electrode 421 to produce an electric field component in the z direction. The net electric field acting on sample molecules in interaction volume 401 is the vector sum of the x, y, and z components.

As indicated at 704 and 714 it is convenient to apply an initial electric field in one direction of sufficient magnitude and duration to preferentially align sample molecules. In the first example (701, 702, 703) sample molecules are oriented relative to the x-direction. In the second example (711, 712, 713) molecules are oriented relative to an axis in the x+y direction. An initial alignment field may be generated in any desired direction by adjusting the voltage applied to electrodes 421, 422 and 426. Following initial alignment, the electric field may be cycled periodically with frequency f as shown at 705 and spectral features from molecular segments oscillating with frequency f may be extracted using a lock-in amplifier or spectrum analyzer. It should be noted that lock-in detection captures the response with frequency of the excitation plus harmonics of the excitation frequency. The cycle may be bipolar or monopolar. In the monopolar case, sample molecules cycle between a preferred orientation corresponding to θ=90 degrees (see FIG. 2) and relax as best shown at 550 in FIG. 5A to a random orientation. In the bipolar case, sample molecules cycle between preferred orientations at θ=90 degrees and θ=−90 degrees. If the excitation frequency is greater than the natural frequency of the sample molecule or molecular fragment, the amplitude of oscillation will be less than 90 degrees. Spectroscopic measurements may be made at a higher frequency than the excitation frequency to provide spectra for a range of orientations and dynamical information via the Doppler shift over the range of orientations. For example the excitation frequency could be 10 MHz and the spectroscopic measurement frequency could be 500 MHz. The measurements could be made with high precision using the device of the above cited HRMS patent.

As indicated at 701, 702 and 703, voltage may be applied to produce electric field components relative to any coordinate axis by the arrangement of the invention. By judicious choice of excitation sequences, the sample molecule or segments thereof may be oriented relative to any combination of θ and φ consequently providing more information than a scan over θ alone.

As shown at 702 and 703, excitation voltages may be pseudo random sequences. Pseudo random sequences may be used in three ways. Firstly, pseudo random sequences may emulate the effect of random molecular collisions. Further the impulse from a random electric field may be significantly larger than the momentum transfer from a molecular collision at the sample temperature. That is the "temperature" of a selected molecular fragment may be much higher than the temperature of surrounding molecules of a different type. The larger impulse from an electric field may for example enable a molecule or fragment thereof overcome a potential energy barrier between a first configuration and a second configuration. The random electric field may guide a molecule through a sequence of configurations that avoid a potential energy barrier between a first configuration and a second configuration. Secondly, pseudo random sequences of electric fields applied at frequencies sufficiently low for molecular alignment with the applied field enable spectra to be measured of a molecular orientation at random intervals. The sequence of spectra may be correlated with the excitation sequence to isolate the spectrum associated with each molecular orientation. This method overcomes the ambiguity of harmonic frequencies associated with periodic excitation. Thirdly, pseudo random sequences may be used to sample molecular orientations over the 4π solid angle of possible molecular orientations randomly with equal probability given to each solid angle interval.

As shown in voltage waveform 702, the sequence of electric field components may be a pseudo-random sequence with a uniform time interval between random states. In this case the response of the sample molecule or fragment thereof may be modeled as the response of an oscillator to an impulsive force. Spectral measurements are correlated with the pseudo-random sequence at control 140 to isolate spectral response correlated with the pseudo-random electric field excitation. Pseudo-random excitation sequences do not produce harmonic responses like periodic excitation sequences do and are preferred for this reason.

As shown in voltage waveform 703, there may be a first sub-sequence with first time interval as indicated at 706 and a second sub-sequence with second time interval as indicated at 707. Sub sequence 706 may be used to measure the spectral response of a small molecular fragment and sub sequence 707 may be used to measure the spectral response of a larger molecular fragment.

The voltage and corresponding electric field magnitude may vary between sequences as shown at 701 and 711 and within a sequence as best seen at 715 of sequence 712. The voltage amplitude may be selected to such that the interaction between the resultant electric field and a molecular fragment overcomes a potential energy barrier. The voltage may be selected to produce an interaction magnitude greater than the magnitude of thermal fluctuations, thereby distinguishing the spectroscopic signal induced by the electric field from thermal noise. The voltage may be selected within a random range to emulate thermal excitations. For example, orthogonal excitation field components may be generated from I and Q components of QAM code schemes used in digital communications.

In the examples shown in FIG. 7, the direction labels x, y and z are for illustrative purposes only. Any of the features illustrated may be applied in any combination relative to any axis.

Figure 8A:
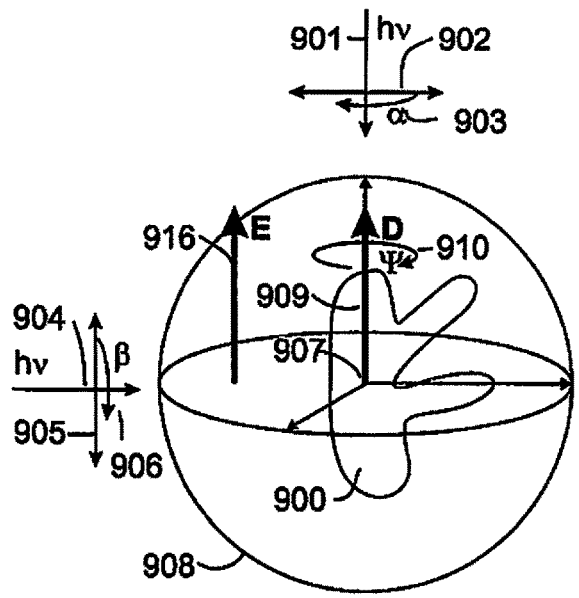
FIGS. 8A and 8B show a molecular fragment within the frame of reference of the measurement system.
Figure 8B:
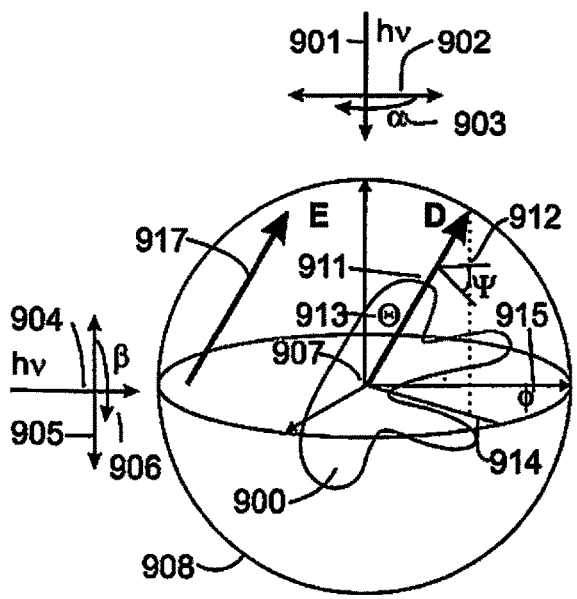

FIGS. 8A and 8B show a molecular fragment 900 within the frame of reference 907 of the measurement means. Probe radiation may be incident on the molecular fragment 900 from different directions as shown at 901 and 904. Probe radiation 901 has orthogonal polarization vector 902 that may be rotated through angle a as shown at 903. Probe radiation 904 has orthogonal polarization vector 905 that may be rotated through angle β as shown at 906. In FIG. 8A molecular fragment 900 has preferred orientation axis D indicated at 909 and may rotate about axis D through angle Ψ as shown at 910. In FIG. 8B molecular fragment 900 has preferred orientation axis D indicated at 911 and may rotate about axis D through angle Ψ as shown at 912. In a system at thermal equilibrium the molecular fragment axis D may point in any direction as indicated by the bounding sphere 908. That is the fragment axis vector may terminate at any point on the bounding sphere 908 surface.

In FIG. 8A the electric field vector is limited to a single axis as shown at 916. Since the molecular orientation axis is fixed by the electric field axis, spectroscopic measurements from all directions described by sphere 908 requires the probe radiation sources to be moved within the frame of reference of the measurement means 907. In practice moving the optical assembly associated with the probe radiation is a slow and cumbersome process. Molecular fragment 900 may rotate freely about fragment axis 909 and every value of Ψ shown at 910 is equally probable. The spectra measured in probe radiation directions 901 and 904 are averages over all values of Ψ. The magnitudes of dipole moments 215 and 216 in FIG. 2A may be measured, but the relative directions of the dipole moments cannot be resolved.

FIG. 8B illustrates advantages of the arrangement shown in FIG. 4A in which the electric field vector 917 can point in any direction. Firstly, the molecular segment axis D shown at 911 may terminate at any point on the surface of sphere 908. The direction of molecular segment axis 911 is conveniently expressed in spherical coordinates θ and ϕ as shown at 913 and 915, respectively. Here ϕ is the angle between the polarization axis 902 and a projection of the molecular segment axis shown at 914. This means that spectra for all angles between probe radiation direction 901 and molecular segment axis may be measured by rotating the molecular fragment axis 911 in the measurement frame of reference 907 with a sequence of electric fields rather than rotating the probe beam apparatus. The molecular segment axis can be rotated to an arbitrary direction very quickly, typically milli-seconds to micro-seconds allowing spectra measurements from a large number of directions to be made. Secondly, the sequence of electric fields can exert torques about molecular axis 911 to direct Ψ to a defined angle as shown at 912. This enables the direction of each transition dipole moment (215 and 216 in FIG. 2A) to be determined. Thirdly, the polarization axis 902 may be fixed because a molecular segment axis rotation through ϕ 915 is equivalent to a rotation of the polarizer angle α at 903. That is spectra for a range of angles between the polarization vector 902 and molecular segment axis 911 may be measured rapidly by rotating the molecular segment axis 911 through angle ϕ at 915.

Figure 8C:
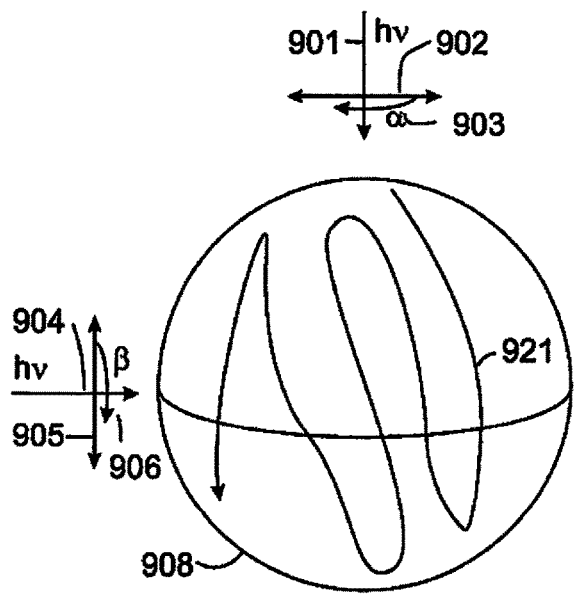
Figure 8D:
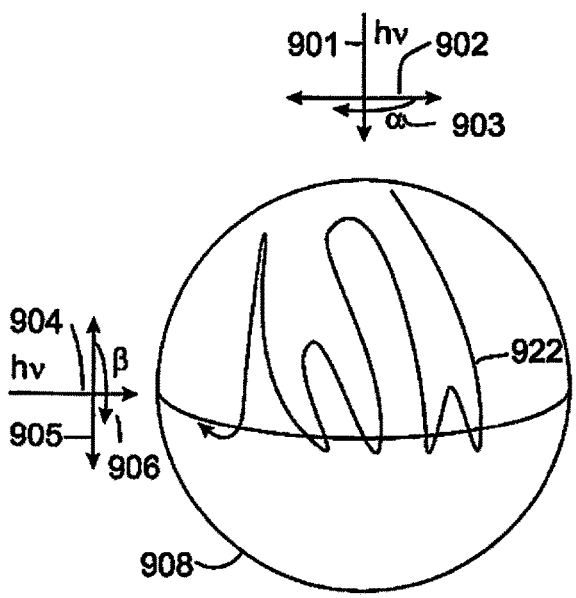

FIGS. 8C and 8D illustrate the effect of applying a sequence of disturbances to a first type of molecule (FIG. 8C) and a second type of molecule (FIG. 8D) that contain the same molecular fragment 900. In the first type of molecule, molecular fragment 900 follows path 921. In the second type of molecule, molecular fragment 900 follows path 922. The paths 921 and 922 differ because the dynamical properties of the first and second molecule types are different. As shown molecular fragment 900 is less constrained and has larger amplitude of motion when attached to the first molecule type (path 921) than when attached to the second molecule type (path 922). A sequence of spectra measured along path 921 differs from a sequence of spectra measured along path 922 enabling a distinction to be made between molecules of the first and second types.

The algorithm controlling operation may be executed by control means 140 in software code, in hardware, or any combination of software and hardware.

The detection process starts by placing sample molecules that may include target molecules in interaction volume 101. Control means 140 retrieves measurement parameters for the target molecule from memory 144 or from an external source 145. The measurement parameters are temporal sequences of device settings together with the required time step for each setting. The polarization of probe radiation is specified, for instance, the angles α and β indicated at 903 and 906 in FIG. 8A, for each measurement time. A temporal sequence of electric field vectors is specified, or equivalently the voltage to be applied to each electrode for each time interval. A temporal sequence of magnetic field vectors is specified, or equivalently the current applied to an electromagnet for each time interval. A temporal sequence of acoustic excitation vectors is specified.

A pseudo code representation of an example measurement algorithm is given. Other algorithms that perform the same types of measurements, for example in a different order may be used. The pseudo code first sets the probe radiation polarization for a set of measurements. At user defined time intervals, the algorithm increments a counter k and sets retrieves the $k^{th}$ electric, magnetic and acoustic fields from a sequence of disturbances and generates signals causing the required fields to be generated. The signals may for example be digital codes directed to a DAC causing a voltage to be generated and transmitted to an electrode. The algorithm next measures m spectra at each detector with time steps between spectra less than or equal to the time step between disturbance changes. For example, the electric, magnetic and acoustic fields may be updated (not necessarily changed) with a frequency of 1 MHz and spectral measurements may be made at a frequency of 100 MHz (100 spectra measured per disturbance state). The multi-dimensional spectra (amplitude and wavelength) so collected are functions of disturbance fields, observation direction and probe radiation polarization.

Optionally raw spectral data may be processed to extract spectral contributions from different molecular segments. The spectral contributions may be extracted using lock-in amplifier techniques or a spectrum analyzer for periodic sample excitation. The spectral contributions may be extracted using a correlator if a pseudo-random sequence of sample excitation. This process has the effect of filtering out noise and enhancing distinct spectral signals.

Optionally, dynamical properties of molecular segments such as T1, T2 and velocity may be extracted by analyzing the temporal dependence of molecular segment spectral features. A curve fitting in process has the effect of filtering out noise and enhancing distinct spectral signals.

A pattern recognition algorithm compares multi-dimensional spectral data from the sample molecules with multi-dimensional spectral data from a target molecule and computes a similarity index. If the similarity index exceeds a threshold value, the sample molecules are classified as target molecules. The multi-dimensional spectra of target molecules may be retrieved from a database. The sample molecules may be compared with a plurality of target molecule types. The similarity index may be calculated with multivariate statistical methods or with artificial intelligence methods that learn patterns in the spectral data, for example with neural networks. The pattern recognition algorithm may operate on raw spectral data, on quantities derived from the raw data or any combination thereof.

Raw spectral data from measurement algorithm and/or data derived from raw spectral data may be analyzed to determine which measurements (and associated disturbances) give the greatest distinction between target molecules of different types. Based on this analysis, the sequence of disturbances may be modified to concentrate measurement time on those measurements with the highest diagnostic value.

The methods described herein may be applied equally well to molecules and to distinct assemblies of molecules. For example, a biological entity such as a virus or bacteria contains many types of separate molecules in roughly constant proportions. Within the scope of this invention, the biological entity is considered to be a single molecule and the constituent molecules are deemed to be molecular fragments.

In summary, ordering on different length scales corresponding to different segment lengths produces a hierarchy of spectra with different time constants. The spectrum of a molecule is the superposition of spectra from each segment wherein the spectrum from each segment is selected from $\theta$, $\phi$ space according to the molecular configuration. The spectrum of a collection of molecules in turn is a superposition of spectra from each molecule. The molecular configuration, and hence the region of $\theta$, $\phi$ space contributing to the spectrum from each molecular segment is selected by a sequence of disturbances which may be acoustic or electromagnetic. In a first embodiment of the invention, a temporal sequence of disturbances produces a temporal sequence of molecular configurations and spectra are measured for two or more molecular configurations in the sequence to give a three dimensional data cube with dimensions wavelength, amplitude and configuration number. In a second embodiment of the invention, further polarization is measured giving a fourth dimension. In another embodiment of the invention that can be used with any other embodiment, spectra are measured in different directions giving and each direction provides a further spectral dimension. In another embodiment of the invention that can be used with any other embodiment, the dimension of frequency response is added. Specifically, the sequence of disturbances includes a frequency sweep wherein a periodic sequence of disturbances is applied at different frequencies and a lock-in amplifier or spectrum analyzer is used to isolate the spectral contribution from each frequency. In another embodiment of the invention that can be used with any other embodiment, further the temperature of the sample is varied. In another embodiment of the invention that can be used with any other embodiment, further a material is added proximate to a molecular segment thereby changing the dynamical properties of the molecular segment.

The invention claimed is:

1. A method for directing interactions between molecules comprising:
   collecting the molecules within an interaction volume;
   applying a sequence of temporally varying perturbations in at least two non-aligned directions to the interaction volume;
   wherein the sequence of temporally varying perturbations is chosen to produce a sequence of perturbed molecular configurations for at least one molecule in the interaction volume;
   obtaining spectral data from a spectroscopy system which provides feedback about said perturbed molecular configurations of molecules and said interactions between the molecules;
   analyzing the feedback to determine the sequence of the temporally varying perturbations that optimize a probability of said interaction between different molecules; and
   based at least in part on the spectral data, selecting the sequence of the temporarily varying perturbations that cause at least one selected orientation of said at least one molecule which increases a probability of said interaction of said at least one molecule with a second molecule.

2. The method according to claim 1 including obtaining orientation data relating to orientations of at least part of at least one of the molecules wherein the sequence of the temporarily varying perturbations is selected based on the orientation data.

3. The method according to claim 2 wherein the orientation data is obtained by creating a known orientation using selected fields.

4. The method according to claim 1 wherein at least one of the sequence of the temporally varying perturbations is caused by acoustic forces and/or by electromagnetic fields.

5. The method according to claim 1 wherein at least one of said sequence of the temporarily varying perturbations is produced by electromagnetic radiation.

6. The method according to claim 1 wherein at least one acoustic disturbance is applied to the interaction volume.

7. The method according to claim 1 wherein said interaction volume comprises a series of interaction volumes where a first sequence of the temporarily varying perturbations is applied to a first interaction volume of said series causing the first molecule and the second molecule to interact forming an interaction complex and a second sequence of the temporarily varying perturbations is applied to a second interaction volume of said series causing interaction between said interaction complex and a third molecule wherein the interaction complex is transported from the first interaction volume to the second interaction volume.

8. The method according to claim 7 wherein said series of interaction volumes are pipelined and a different sequence of the temporarily varying perturbations is applied to each interaction volume of said series.

9. The method according to claim 1 wherein said at least one molecule is cycled periodically through a sequence of reactive configurations by the sequence of the temporarily varying perturbations.

10. The method according to claim 7 wherein said interaction between said at least one first molecule and said second molecule operates to change an optical property and said change in optical property is detected to determine whether said interaction has occurred.

11. The method according to claim 1 wherein said at least one molecule comprises a plurality of different molecule types and wherein each of said different molecule types is cycled through a sequence of configurations by the sequence of the temporarily varying perturbations so as to be tested for said interaction with said second molecule as a recognition complex.

12. The method according to claim 11 wherein said interaction is determined using spectroscopic measurements.

13. The method according to claim 1 wherein said second molecule for reaction with said at least one molecule is attached to a support substrate and maintained oriented thereon relative to an axis of the support substrate.

14. The method according to claim 13 wherein said support substrate is fixed.

15. The method according to claim 13 wherein said support substrate bounds the interaction volume.

16. The method according to claim 13 wherein said support substrate comprises a magnetic object which is oriented by a sequence of one or more magnetic fields.

17. The method according to claim 1 wherein a concentration of said least one molecule in the interaction volume is determined using spectroscopic measurements.

18. The method according to claim 1 wherein the spectral data used to select the sequence of the temporarily varying perturbations is obtained by detecting orientations of said at least one target molecule by directing a sequence of probe radiation incident on at least one sample molecule of said at least one molecule in at least two perturbed molecular configurations wherein at least one wavelength in the incident probe radiation beam interacts with said at least one sample molecule to form interaction radiation;

and collecting said interaction radiation that has at least in part interacted with said at least one sample molecule in said at least two perturbed molecular configurations.

19. The method according to claim 1 wherein an electrode linked with voltage supply is shaped to act as a Fresnel lens for radiation entering or exiting the interaction volume where the Fresnel lens is used to focus incident radiation to a point within the interaction volume while generating a spatially uniform electric field within the interaction volume.

20. The method according to claim 1 wherein the probability of said interaction of a third molecule with said second molecule is decreased.

21. The method according to claim 1 wherein at least one of the perturbations is caused by a flux of solvent molecules.

22. The method according to claim 1 wherein the sequence of perturbations includes a first state applied for a first period that induces a said selected orientation for said at least one molecule in the interaction volume.

23. The method according to claim 1 wherein the sequence of perturbations is selected such that in said at least one selected orientation said at least one molecule interacts with said second molecule and does not interact with a third molecule.

24. The method according to claim 1 wherein the sequence of perturbations is selected by an artificial intelligence algorithm analyzing spectra relating to said at least one molecules in the interaction volume.

* * * * *